(12) United States Patent
Hu et al.

(10) Patent No.: US 11,438,508 B2
(45) Date of Patent: Sep. 6, 2022

(54) SYSTEMS, METHODS, AND APPARATUSES FOR IMPLEMENTING AN IMAGE SENSOR RECONFIGURATION FRAMEWORK FOR SEAMLESS RESOLUTION-BASED TRADEOFFS

(71) Applicant: Arizona Board of Regents on Behalf of Arizona State University, Scottsdale, AZ (US)

(72) Inventors: Jinhan Hu, Chandler, AZ (US); Robert LiKamWa, Tempe, AZ (US); Alexander Shearer, Tempe, AZ (US); Saranya Rajagopalan, Tempe, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 16/898,791

(22) Filed: Jun. 11, 2020

(65) Prior Publication Data

US 2020/0396384 A1 Dec. 17, 2020

Related U.S. Application Data

(60) Provisional application No. 62/860,193, filed on Jun. 11, 2019.

(51) Int. Cl.
*H04N 5/232* (2006.01)
*G06T 1/20* (2006.01)
*G06T 1/60* (2006.01)

(52) U.S. Cl.
CPC ......... *H04N 5/232411* (2018.08); *G06T 1/20* (2013.01); *G06T 1/60* (2013.01); *H04N 5/23222* (2013.01); *H04N 5/23245* (2013.01)

(58) Field of Classification Search
CPC .......... H04N 5/23222; H04N 5/23242; H04N 5/232422; H04N 5/23245; H04N 5/343;
(Continued)

(56) References Cited

U.S. PATENT DOCUMENTS

| | | | |
|---|---|---|---|
| 2003/0090571 A1* | 5/2003 | Scheurich | H04N 5/4448 348/207.1 |
| 2014/0111670 A1* | 4/2014 | Lord | H04N 5/23206 348/240.99 |
| 2016/0080652 A1* | 3/2016 | Shirota | G06F 21/83 348/222.1 |

OTHER PUBLICATIONS

Adams, A. et al., "The Frankencamera: An Experimental Platform for Computational Photography," ACM Transactions on Graphics, vol. 29, No. 4, 2010, Article No. 29, pp. 1-12, Association for Computing Machinery, New York, NY.
(Continued)

*Primary Examiner* — Paul M Berardesca
(74) *Attorney, Agent, or Firm* — Elliott, Ostrander & Preston, P.C.

(57) ABSTRACT

In accordance with embodiments disclosed herein, there are provided herein systems, methods, and apparatuses for implementing an image sensor reconfiguration framework for seamless resolution-based tradeoffs. For example, there is disclosed a system for performing a resolution reconfiguration of an image sensor without dropping frames; in which such a system includes: means for opening an image device having the image sensor embedded therein; means for setting the image sensor to a first sensor format: means for requesting and mapping buffers for a vision data stream from the image sensor in accordance with the first sensor format; means for receiving a resolution reconfiguration request to change the image sensor from the first sensor format to a second sensor format; and means for performing a parallel reconfiguration of the image sensor, wherein the image
(Continued)

device continues to process the vision data stream from the image sensor in accordance with the first sensor format in parallel with the image device resetting the image sensor to the second sensor format. Other related embodiments are disclosed.

16 Claims, 16 Drawing Sheets

(58) Field of Classification Search
CPC . G06F 1/3206–3231; G06F 9/50–5094; G06T 1/20; G06T 1/60
See application file for complete search history.

(56) References Cited

OTHER PUBLICATIONS

Apple, "Use HDR on your iPhone, iPad, and iPod touch", obtained from https://support.apple.com/en-us/HT207470, 2018, 1 page. Page No. Longer Accessible.
Berenbaum, S. "Google Glass Explorer Edition has a 30-minute battery life while shooting video," obtained from https://www.digitaltrends.com/mobile/google-glass-30-minute-videobattery/, 2013, 10 pages.
Buckler, M. et al., "EVA2: Exploiting Temporal Redundancy in Live Computer Vision" 2018 ACM/IEEE 45th Annual International Symposium on Computer Architecture (ISCA), 2018, pp. 533-546.
Buckler, M. et al., "Reconfiguring the Imaging Pipeline for Computer Vision," Proceedings of the IEEE International Conference on Computer Vision, 2017, pp. 975-984.
Chen, T. et al., "Glimpse: Continuous, Real-Time Object Recognition on Mobile Devices," Get-Mobile: Mobile Computing and Communications, vol. 20, No. 1,2016, pp. 26-29, Association for Computing Machinery, New York, NY.
Chu, D. et al., "Balancing Energy, Latency and Accuracy for Mobile Sensor Data Classification," Proceedings of the 9th ACM Conference on Embedded Networked Sensor Systems, 2011, pp. 54-67, Association for Computing Machinery, New York, NY.
Google, "ARcore," obtained from https://developers.google.com/ar//on Sep. 23, 2021, 2019, 3 pages.
Ha, K. et al., "Towards Wearable Cognitive Assistance," Proceedings of the 12th Annual International Conference on Mobile Systems, Applications, and Services, 2014, pp. 68-81, Association for Computing Machinery, New York, NY.
Haris, M. et al., "Task-Driven Super Resolution: Object Detection in Low-resolution Images," arXiv:1803.11316, CoRRabs/1803.11316, 2018, pp. 1-26.
Hegarty, J. et al., "Darkroom: Compiling High-level Image Processing Code into Hardware Pipelines," ACM Transactions on Graphics, vol. 33, No. 4, Article 14, 2014, 11 pages, Association for Computing Machinery, New York, NY.
Hegarty, J. et al., "Rigel: Flexible Multi-rate Image Processing Hardware," ACM Transactions on Graphics, vol. 35, 2016, pp. 1-11, Association for Computing Machinery, New York, NY.
Hu, J. et al., "Banner: An Image Sensor Reconfiguration Framework for Seamless Resolution-based Tradeoffs," MobiSys '19: Proceedings of the 17th Annual International Conference on Mobile Systems, Applications, and Services, 2019, pp. 236-248, Association for Computing Machinery, New York, NY.
Hu, J. et al., "Characterizing the Reconfiguration Latency of Image Sensor Resolution on Android Device" In Proceedings of the 19th International Workshop on Mobile Computing Systems & Applications, 2018, pp. 81-86, Association for Computing Machinery, New York, NY.
Ibrahim, R.M., "Camera," 2019, obtained from https://github.com/rizwankce/Camera/on Sep. 23, 2021, 2 pages.
Kang, S. et al., "SeeMon: scalable and energy-efficient context monitoring framework for sensor-rich mobile environments." In Proceedings of the 6th international conference on Mobile systems, applications, and services, 2008, pp. 267-280.
Khronos Group, "Camera BOF," 2013, obtained from https://www.khronos.org/assets/uploads/developers/Tibrary/2013-siggraph-camera-bof/Camera-BOF_SIGGRAPH-2013.pdf, 30 pages.
Kodukula, V. et al., "A Case for Temperature-Driven Task Migration to Balance Energy Efficiency and Image Quality of Vision Processing Workloads," In Proceedings of the 19th International Workshop on Mobile Computing Systems & Applications, 2018, pp. 93-98, Association for Computing Machinery, New York, NY.
Kumar, A.R. et al. "Pack and Detect: Fast Object Detection in Videos Using Region-of- Interest Packing" ArXiv e-prints, Article arXiv:1809.01701,2018, pp. 1-15.
Likamwa, R. et al., "Energy Characterization and Optimization of Image Sensing Toward Continuous Mobile Vision," In Proceeding of the 11th annual international conference on Mobile systems, applications, and services, 2013, pp. 69-82, Association for Computing Machinery, New York, NY.
Likamwa, R. et al., "Starfish: Efficient Concurrency Support for Computer Vision Applications," In Proceedings of the 13th Annual International Conference on Mobile Systems, Applications, and Services, (MobiSys '15), 2015, pp. 213-226, Association for Computing Machinery, New York, NY.
Lin, F.X. et al., "Reflex: Using Low-power Processors in Smartphones Without Knowing Them" Acm Sigarch Computer Architecture News, vol. 40, No. 1, 2012, pp. 13-24, Association for Computing Machinery, New York, NY.
Lin, K. et al., "Energy-accuracy Trade-off for Continuous Mobile Device Location," In Proceedings of the 8th international conference on Mobile systems, applications, and services, 2010, pp. 285-298, Association for Computing Machinery, New York, NY.
Lin, T.Y. et al., "Focal Loss for Dense Object Detection," obtained from http://arxiv.org/abs/1708.02002, arXiv:1708.02002, CoRR abs/1708.02002, 2017 (revised 2018), 10 pages.
Micron Technology, "Calculating Memory System Power for DDR. TN-46-03—Calculating DDR Memory System Power Introduction," obtained from https://www.micron.com/-/media/client/global/Documents/Products/Technical% 20Note/DRAM/TN4603.pdf, 2001, 26 pages.
ON Semiconductor, "AR0330 1/3-inch CMOS Digital Image Sensor," obtained from https://www.mouser.com/datasheet/2/308/AR0330CM-D-888215.pdf, ON Semiconductor, Rev. 18, 2017, 54 pages.
ON Semiconductor, "MT9P031 1/2.5-Inch 5 Mp CMOS Digital Image Sensor," obtained from https://www.onsemi.com/pdf/datasheet/mt9p031-d.pdf, ON Semiconductor. Rev. 10, 2017, 32 pages.
Priyantha, B. et al., "LittleRock: Enabling Energy-Efficient Continuous Sensing on Mobile Phones," IEEE Pervasive Computing, vol. 10, Issue 2, 2011, pp. 12-15.
Priyantha, D. et al., "EERS: Energy Efficient Responsive Sleeping on Mobile Phones," obtained from http://sensorlab.cs.dartmouth.edu/phonesense/papers/Priyantha-EERS.pdf, 2010, 5 pages.
Redmon, J. et al., "YOLOv3: An Incremental Improvement," obtained from http://arxiv.org/abs/1804.02767, arXiv:1804.02767, CoRR abs/1804.02767, 2018, 7 pages.
Roy, N. et al., "An energy-efficient quality adaptive framework for multi-modal sensor context recognition," In Proceedings of the 2011 IEEE International Conference on Pervasive Computing and Communications (PERCOM '11), 2011, pp. 63-73, IEEE, New York, NY.
Ruzicka, V. et al., "Fast and accurate object detection in high resolution 4K and 8K video using GPUs," obtained from http://arxiv.org/abs/1810.10551, arXiv:1810.10551, CoRR abs/1810.1055, 2018, 7 pages.
Samsung, "[In-Depth Look] Fast, Fun and In-Focus: The Galaxy S8 Camera," obtained from https://news.samsung.com/global/in-depth-look-fast-fun-and-in-focus-the-galaxy-s8-camera on Sep. 23, 2021, 2017, 8 pages.
Sundaram, N., "Making computer vision computationally efficient," obtained from http://www2.eecs.berkeley.edu/Pubs/TechRpts/2012/EECS-2012-106.html, EECS Department, University of California, Berkeley, 2012, 161 pages.

(56) References Cited

OTHER PUBLICATIONS

The kernel development community, ioctl VIDIOC_REQBUFS, 2019, obtained from https://www.kernel.org/doc/html/latest/userspace-api/media/v4l/vidioc-reqbufs.html , last accessed Jun. 11, 2021, 3 pages.

The kernel development community, V4L2 video capture example, obtained from https://www.kernel.org/doc/html/v4.16/media/uapi/v4l/capture.c.html, last accessed Jun. 11, 2021, 11 pages.

Vuforia, "Innovate With Industrial Augmented Reality," obtained from https://www.ptc.com/en/products/augmented-reality/ on Sep. 23, 2021, 2019, 7 pages.

Wikipedia, "High-dynamic-range imaging", obtained from https://en.wikipedia.org/wiki/High-dynamic-range_imaging on Sep. 23, 2021, 2018, last edited Jun. 10, 2021, 12 pages.

Zhang, B. et al., "Exploring Energy and Accuracy Tradeoff in Structure Simplification of Trained Deep Neural Networks," In Proceedings of the 23rd Asia and South Pacific Design Automation Conference (ASPDAC '18), 2018, pp. 331-336, IEEE, New York, NY.

* cited by examiner

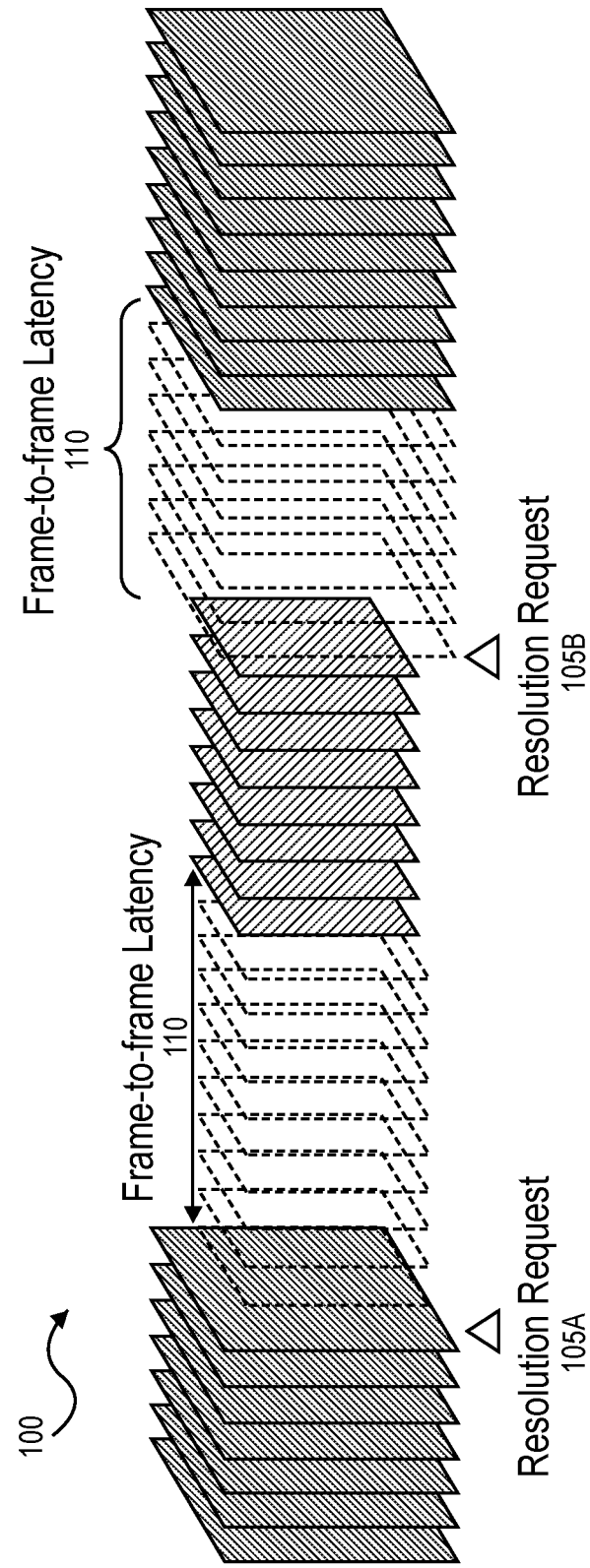

FIG. 3

| Reconfiguration operation | Average execution time |
|---|---|
| Stop streaming | 75 ms |
| Initialize device | 31 ms |
| Start streaming | 72 ms |

300

900

| Resolution-Framework | SOC | GPU | DDR | CPU |
|---|---|---|---|---|
| 1920x1080-V4L2 | 803 | 230 | 951 | 879 |
| 1280x720-V4L2 | 637 | 230 | 686 | 693 |
| 640x480-V4L2 | 612 | 230 | 618 | 613 |
| 99x-reconf.-V4L2 | 659 | 230 | 719 | 691 |
| 99x-reconf.-Banner | 620 | 230 | 644 | 600 |

```
Start
  │
  ▼
```

| Executing, via a processor and memory of a specially configured system, a method for performing a resolution reconfiguration of an image sensor without dropping frames, wherein the method includes: 1105 |

```
  │
  ▼
```

| Opening an image device having the image sensor embedded therein. 1110 |

```
  │
  ▼
```

| Setting the image sensor to a first sensor format. 1115 |

```
  │
  ▼
```

| Requesting and mapping buffers for a vision data stream from the image sensor in accordance with the first sensor format. 1120 |

```
  │
  ▼
```

| Streaming the vision data stream from the image sensor in accordance with the first sensor format. 1125 |

```
  │
  ▼
```

| Receiving a resolution reconfiguration request to change the image sensor from the first sensor format to a second sensor format. 1130 |

```
  │
  ▼
```

| Performing a parallel reconfiguration of the image sensor, wherein the image device continues to process the vision data stream from the image sensor in accordance with the first sensor format in parallel with the image device resetting the image sensor to the second sensor format. 1135 |

```
  │
  ▼
 End
```

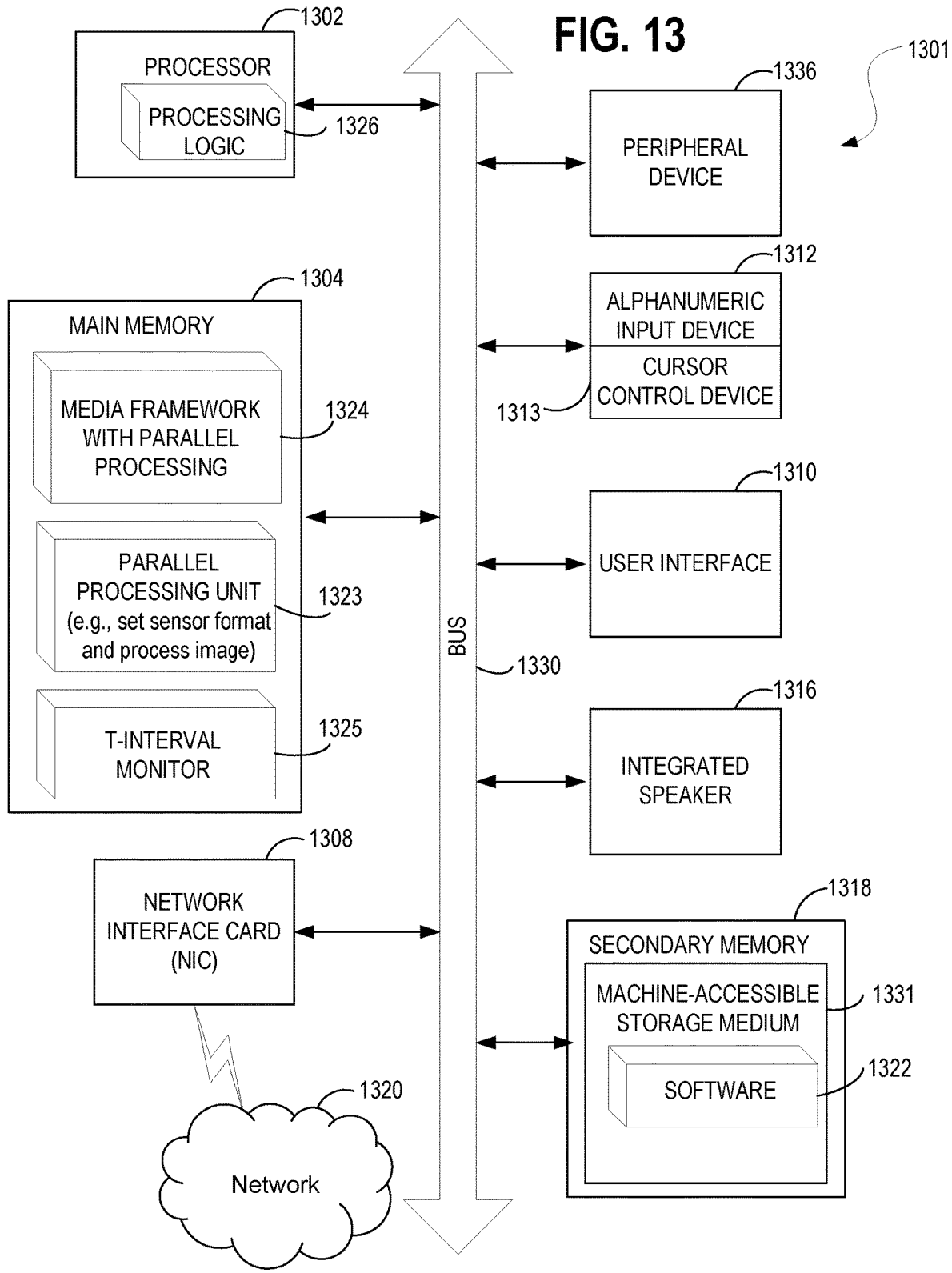

SYSTEMS, METHODS, AND APPARATUSES FOR IMPLEMENTING AN IMAGE SENSOR RECONFIGURATION FRAMEWORK FOR SEAMLESS RESOLUTION-BASED TRADEOFFS

CLAIM OF PRIORITY

This non-provisional U.S. Utility Patent Application is related to, and claims priority to, U.S. Provisional Patent Application No. 62/860,193, filed Jun. 11, 2019, entitled "SYSTEMS, METHODS, AND APPARATUSES FOR IMPLEMENTING AN IMAGE SENSOR RECONFIGURATION FRAMEWORK FOR SEAMLESS RESOLUTION-BASED TRADEOFFS," the entire contents of which are incorporated by reference herein.

GOVERNMENT RIGHTS AND GOVERNMENT AGENCY SUPPORT NOTICE

This invention was made with government support under 1657602 awarded by the National Science Foundation. The government has certain rights in the invention.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments of the invention relate generally to the field of image sensors and processing, and more particularly, to systems, methods, and apparatuses for implementing an image sensor reconfiguration framework for seamless resolution-based tradeoffs.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to embodiments of the claimed inventions.

Visual sensing of imagery via computing hardware is enabled via an image sensor or imager which detects and conveys information used which may then be utilized by the computing hardware to create a recognizable image. This is accomplished by converting the variable attenuation of light waves as they pass through or reflect off objects into signals or small bursts of current which convey such information within the computing hardware and image processing components.

The waves may be light or other electromagnetic radiation depending upon the implementation of the particular image sensor. Such image sensors are commonly utilized by a wide variety of electronic imaging devices of both analog and digital types, including for example, digital cameras, camera modules, medical imaging equipment, night vision equipment such as thermal imaging devices, radar, sonar, and others, with digital imaging circuitry quickly replacing analog imaging in nearly all use cases.

Presently, image sensors are typically implemented via semiconductor charge-coupled devices (CCD) or active pixel sensors in complementary metal-oxide-semiconductor (CMOS) or N-type metal-oxide-semiconductor (NMOS, Live MOS) technologies while less common analog sensors for invisible radiation use cases tend to utilize vacuum tubes of various kinds.

Problematically, the high energy consumption of visual sensing circuitry stands as a continuing obstacle which impedes the future of mobile vision. Such a future is envisioned in which devices are enabled to continuously compute visual information from a stream of incoming sensory data, for example, for use via visual personal assistants or for augmented reality (AR).

While it is technically feasible to perform continuous computation of visual information, such use cases are limited to computing hardware with a non-limited power source, such as electrical AC power. As may be readily understood by any person with a smart phone, high energy consumption applications will quickly deplete any mobile energy reserves, thus "draining the battery" of the mobile device and rendering the entirety of the computing hardware for that mobile device utterly useless, thus negating any ability to perform continuous computation of visual information.

There is needed an improved methodology for performing continuous computation of visual information on mobile devices and other battery dependent computing hardware that reduces overall energy consumption so as to enable extended battery life, yet, provide the benefits and enabling the use cases which are made possible via continuous computation of visual information on such mobile devices.

Embodiments of the invention therefore improve the ability to perform continuous computation of visual information on mobile devices while reducing overall energy consumption so as to reduce depletion of the mobile devices battery and thus in turn extend the battery life and operational capabilities of the mobile computing hardware while in a battery dependent mode.

The present state of the art may therefore benefit from systems, methods, and apparatuses for implementing an image sensor reconfiguration framework for seamless resolution-based tradeoffs as are described herein.

BRIEF DESCRIPTION OF THE DRAWINGS

Embodiments are illustrated by way of example, and not by way of limitation, and can be more fully understood with reference to the following detailed description when considered in connection with the figures in which:

FIGS. 1A and 1B depict frame-to-frame latency associated with any change in sensor resolution which leads to a substantial pause in frame delivery in current systems in comparison with the "Banner" media framework which completely removes frame-to-frame latency when reconfiguring sensor resolution, in accordance with embodiments of the invention;

FIG. 3 provides a table listing various time-expensive operations and their average cost in milliseconds to execute with current sensor resolution reconfiguration procedures, in accordance with described embodiments;

FIG. 11 depicts a flow diagram illustrating a method for implementing an image sensor reconfiguration framework for seamless resolution-based tradeoffs, in accordance with the described embodiments;

FIG. 13 illustrates a diagrammatic representation of a machine in the exemplary form of a computer system, in accordance with one embodiment.

DETAILED DESCRIPTION

Figure 1B:
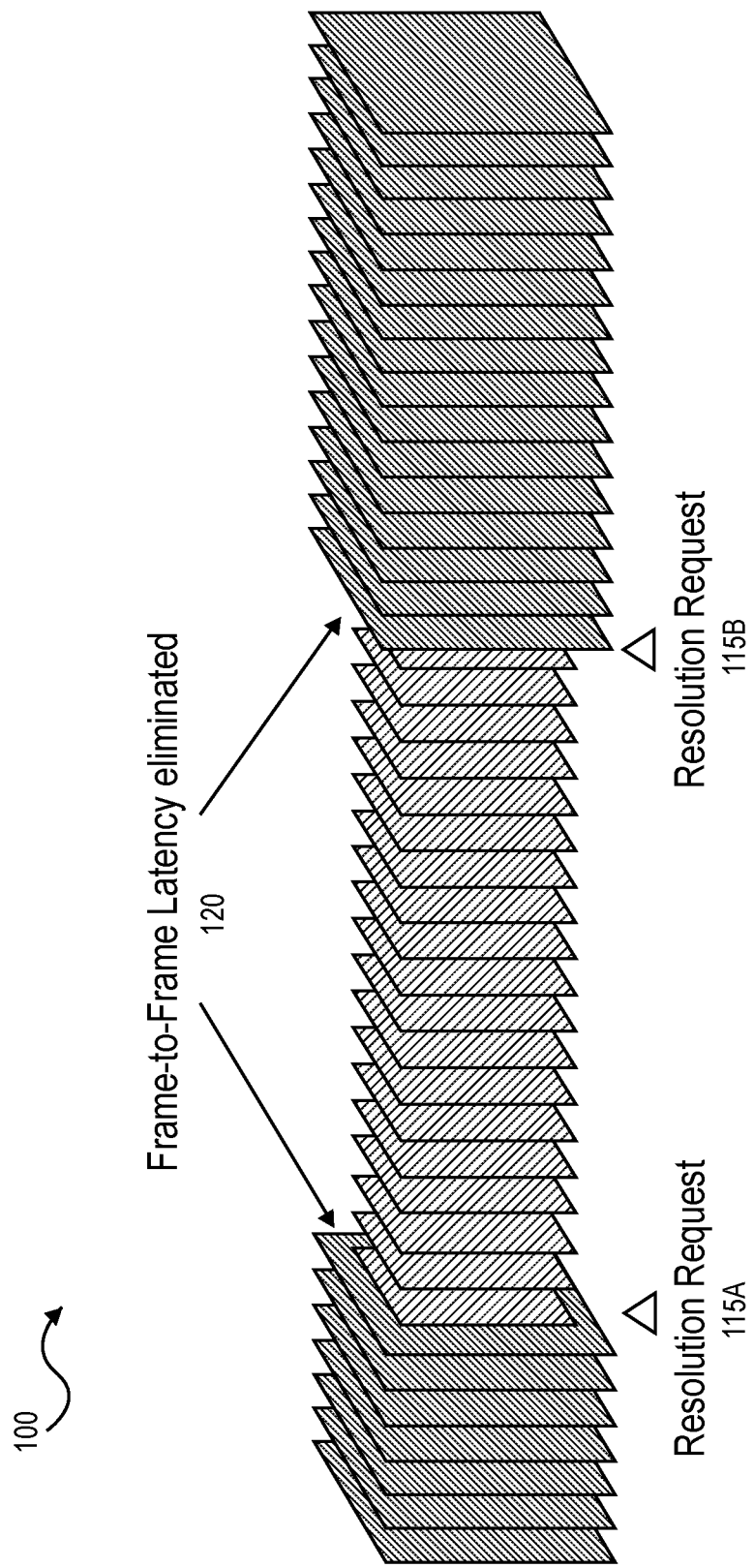

Described herein are systems, methods, and apparatuses for implementing an image sensor reconfiguration framework for seamless resolution-based tradeoffs. For example, there is disclosed a system for performing a resolution reconfiguration of an image sensor without dropping frames; in which such a system includes: means for opening an image device having the image sensor embedded therein; means for setting the image sensor to a first sensor format; means for requesting and mapping buffers for a vision data stream from the image sensor in accordance with the first sensor format; means for streaming the vision data stream from the image sensor in accordance with the first sensor format; means for receiving a resolution reconfiguration request to change the image sensor from the first sensor format to a second sensor format; and means for performing a parallel reconfiguration of the image sensor, wherein the image device continues to process the vision data stream from the image sensor in accordance with the first sensor format in parallel with the image device resetting the image sensor to the second sensor format.

Embodiments of the invention as described herein improve the ability to perform continuous computation of visual information on mobile devices while reducing overall energy consumption.

Such mobile vision systems benefit from the ability to situationally sacrifice image resolution in order to save or preserve system energy when imaging detail from the computation of incoming visual information is determined to be unnecessary.

Unfortunately, prior image processing frameworks require that any resolution reconfiguration request of the current system performing such image processing stop or halt processing via the image processing framework which thus in turn stops outputting or providing any image frames to the application until the reconfiguration request completes. Thus, the processing of a resolution reconfiguration request effectively results in a blind spot for the incoming image data stream for which there is no processed imagery output to the application whatsoever. Depending upon the particular use case, this problem of having to halt the image processing framework and wait for the resolution reconfiguration request to complete may range from a mere annoyance to a life threatening problem, for example, where the image processing is relied upon as part of a virtualized visual assistant. Many other use cases may similarly be affected in a negative manner by the problem of having to halt and wait for the completion of a resolution reconfiguration request for the image processing framework.

With such conventional image processing frameworks, frame delivery is bottlenecked by a sequence of reconfiguration procedures and memory management in current operating systems before it resumes at the new resolution, thus necessitating the halt and resume procedure. This latency from reconfiguration, measured at a substantial 280 ms, drastically impedes the adoption of otherwise beneficial resolution vs. energy consumption tradeoff mechanisms.

Therefore, it is in accordance with described embodiments, that Applicants disclose implementation and utilization of a "Banner" media framework that permits rapid sensor resolution reconfiguration service as a much needed modification to previously available media frameworks, such as the common "Video4Linux" version 2.0 or the "V4L2 media framework. The Video4Linux, V4L for short and Video4Linux" version 2.0 or V4L2 for short is a collection of device drivers and an API for supporting realtime video capture on Linux systems, supporting many USB webcams, TV tuners, and related devices, standardizing their output, so programmers can easily add video support to their applications. MythTV, tvtime and TVHeadend are typical applications that use the V4L framework. V4L2 is the second version of V4L. Video4Linux2 fixed certain design issues and started appearing in the Linux 2.5.x kernels.

Notably, the V4L and V4L2 media frameworks both require utilization of the halt and resume procedure when transitioning between video resolution configurations.

According to certain embodiments, the "Banner" media framework as described herein completely eliminates the frame-to-frame reconfiguration latency, typically ranging from 226 ms to 33 ms, thus wholly eliminating and negating any frame drop issues during sensor resolution reconfiguration. Stated differently, no frames are missed, despite the occurrence of a sensor resolution reconfiguration within the media processing framework.

With other embodiments, the "Banner" media framework halves the end-to-end resolution reconfiguration latency from an approximate 226 ms processing cycle down to an exemplary 105 ms processing cycle, thus enabling a more than 49% reduction of system power consumption by allowing the system to reconfigure the sensor resolution to 480p compared with downsampling 1080p to 480p, as measured in a cloud-based offloading workload running on a Jetson TX2 board. As a result, the "Banner" media framework unlocks unprecedented capabilities for mobile vision applications to dynamically reconfiguring sensor resolutions to balance the energy efficiency and task accuracy tradeoff.

While vision algorithms continue to improve in task accuracy and speed, mobile and wearable vision systems fail to achieve sufficient battery lifetimes when vision tasks are continuously running.

A continuous video capture drains the battery of Google Glass in 30 minutes. It is well known that a culprit is the energy-expensive traffic of image data. Transferring high resolutions at high frame rates draws substantial power consumption from the analog-digital conversion, the sensor interface transactions, and memory usage. Simply capturing 1080p frames at 30 frames per second consumes more than 2.4 W system power measured on a MOTO Z smartphone. And yet, capturing and displaying 480p frames only consumes 1.3 W system power, a nearly 50% power savings.

Image resolution can create an interesting tradeoff for visual tasks, in which low resolution promotes low energy consumption, while high resolution promotes high imaging fidelity for high visual task accuracy.

For example, as measured by an Augmented Reality (AR) marker-based pose estimation case study, lower resolutions suffice when an AR marker is close, yet high resolutions are needed when the AR marker is too far away or very small. This tradeoff has been explored for several visual computing system works for marker pose estimation, object detection, and face recognition, however, such Augmented Reality systems tend to favor utilizing of high resolution video so as to account for the lowest common denominator or worst case scenario problem, in which objects are small and far away.

However, according to described embodiments, such Augmented Reality systems utilizing the "Banner" media framework and the methodologies described herein may transition back and forth between high and low resolution media processing configurations without losing frames and without inducing reconfiguration latency, thus permitting the Augmented Reality systems to operate in low resolution at lower power when it remains feasible to do so, and only transition to a higher power consumption high-resolution image processing configuration when necessary to process and detect smaller or more distant objects. In such a way, an AR application may deliver the same result, and yet, do so with lower power consumption assuming the AR application spends at least a portion of its time in the low resolution image processing configuration.

It is therefore in accordance with described embodiments that mobile vision systems benefit from the ability to situationally sacrifice image resolution to save system energy when imaging detail is unnecessary. Unfortunately, as was noted above, conventional solutions operate such that any change in sensor resolution leads to a substantial pause in frame delivery.

Such reconfiguring of sensor resolution in Android OS prevents the application from receiving frames for about 267 ms as experimentally measured, which is the equivalent of dropping 9 frames (working at 30 FPS) from vision processing pipelines. Consequently, computer vision processing applications simply do not change resolutions at runtime despite the significant energy savings possible at lower resolutions.

For example, Augmented Reality applications such as "Augment" and "UnifiedAR" constantly work at 1080p, drawing 2.7 W of system power as a way of accounting for the above described worst case scenario problem.

It is therefore in accordance with described embodiments that implementation and utilization of the "Banner" media framework targets the image sensor resolution reconfiguration latency which is a chief impediment of energy-efficient visual systems.

According to a particular embodiment, resolution reconfiguration latency is broken down into two types of latency. Firstly, end-to-end reconfiguration latency which is the time between an application's request to change resolution and the time the application receives a frame of the new resolution. Secondly, the frame-to-frame latency which is the interval between two frames provided to the application and in which the latter frame is configured at the new resolution.

The problem of long resolution reconfiguration latency is common across all mobile platforms as experimentally measured on different devices. In Android OS, there was a 400 ms end-to-end reconfiguration latency. In the Linux V4L2 media framework, there was experimentally observed a 260 ms end-to-end reconfiguration latency. End-to-end reconfiguration latency in iOS was experimentally observed to take around 400 ms. Similarly, end-to-end reconfiguration latency in Gstreamer with Nvidia Libargus was experimentally observed to consume more than 300 ms.

The resolution reconfiguration latency originates from the operating system. Conversely, at the sensor level hardware register values are effective by the next frame.

Derived from experiments on the Android OS, it was noted that the problem stems from the lower level system and specifically from the media frameworks in the OS kernel.

One underlying issue is that image sensor resolution reconfiguration undergoes a sequential procedure deep inside the kernel's media frameworks. Furthermore, the sequential procedure frequently invokes expensive system calls.

Experimentation with the media frameworks exposed several key insights.

First, the current streaming pipeline needs to be preserved during resolution reconfiguration such that frames already captured at the previous resolution are useful and need to be read out.

Second, resolution change should also be immediately effective in the next capture and in so doing, the capture will be available after moving through the pipeline.

Third, synchronizing the resolution of frame buffers across the system stack is expensive and should be avoided, and yet, conventional solutions use of the media frameworks incur expensive system calls which repeatedly allocate memory for the frame buffers.

Therefore, disclosed embodiments which exploit these key insights have designed and leveraged the so called "Banner" media framework which thus provides a system solution for rapid sensor resolution reconfiguration. The "Banner" media framework revolves around two techniques according to a specific embodiment. For instance, parallel reconfiguration maintains video capture streams and schedules sensor reconfiguration in parallel while the application is processing the frame whilst simultaneously, format-oblivious memory management removes repeated memory allocation from the reconfiguration procedure, avoiding expensive system calls.

Using these techniques, the "Banner" media framework completely eliminates frame-to-frame latency, allowing for seamless multi-resolution frame capture. The "Banner" media framework also achieves the minimum end-to-end reconfiguration latency, fundamentally bounded by the pipeline latency of frame readout.

Through experimentation, the "Banner" media framework has been evaluated with an efficacy within the Linux V4L2 framework by running three workloads on a Jetson TX2 board, including display-only, cloud-based offloading, and marker-based pose estimation. Such evaluation confirms that the "Banner" media framework completely eliminates frame-to-frame latency, even for workloads operating at 30 FPS. The reduction in reconfiguration latency results in a 49% power consumption reduction by reconfiguring the resolution from 1080p to 480p comparing with computationally downsampling 1080p to 480p.

Although implementation and evaluation was conducted utilizing Linux V4L2, these identical methodologies are generalizable to other media frameworks, such as Gstreamer, and Linux-based operating systems, including Android.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well-known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a specialized and special-purpose processor having been programmed with the instructions to perform the operations described herein. Alternatively, the operations may be performed by a combination of hardware and software. In such a way, the embodiments of the invention provide a technical solution to a technical problem.

Embodiments also relate to an apparatus for performing the operations disclosed herein. This apparatus may be specially constructed for the required purposes, or it may be a special purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various customizable and special purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.), a machine (e.g., computer) readable transmission medium (electrical, optical, acoustical), Radio-frequency identification (RFID) chips or tags, etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

In addition to various hardware components depicted in the figures and described herein, embodiments further include various operations which are described below. The operations described in accordance with such embodiments may be performed by hardware components or may be embodied in machine-executable instructions, which may be used to cause a special-purpose processor programmed with the instructions to perform the operations. Alternatively, the operations may be performed by a combination of hardware and software, including software instructions that perform the operations described herein via memory and one or more processors of a computing platform.

FIGS. 1A and 1B depict frame-to-frame latency associated with any change in sensor resolution which leads to a substantial pause in frame delivery in current systems 100 in comparison with the "Banner" media framework 101 which completely removes frame-to-frame latency when reconfiguring sensor resolution, in accordance with embodiments of the invention.

As depicted at FIG. 1A, frame to frame latency 110 is induced into the system 100 upon a first resolution request 105A and then additional frame to frame latency 110 is again induced into the system 100 upon the second resolution request 105B, significantly degrading performance of the system.

Conversely, frame-to-frame latency is wholly eliminated in the system 101 depicted at FIG. 1B, with the Banner system completely eliminating all frame-to-frame latency as depicted by element 120, despite receiving a request for reconfiguration sensor resolution at each of elements 115A and 115B.

With regard to FIGS. 1A and 1B, it is described herein that practice of disclosed embodiments in conjunction with mobile vision systems would benefit from the ability to situationally sacrifice image resolution to save system energy when imaging detail is unnecessary.

However, upon any resolution reconfiguration request, current system frameworks stop providing image frames to the application until the reconfiguration completes.

Consequently, frame delivery is bottlenecked by a sequence of reconfiguration procedures and memory management in current operating systems before it resumes at the new resolution. This latency from reconfiguration—a substantial 280 ms—impedes the adoption of otherwise beneficial resolution-energy tradeoff mechanisms.

The "Banner" media framework 101 described herein provides a media framework with a rapid sensor resolution reconfiguration service as a modification to common media frameworks, e.g., V4L2. The "Banner" media framework 101 completely eliminates 120 the frame-to-frame reconfiguration latency (226 ms to 33 ms), thus removing the frame drop during sensor resolution reconfiguration. The "Banner" media framework 101 halves the end-to-end resolution reconfiguration latency (226 ms to 105 ms) in accordance with certain embodiments, thus enabling a more than 49% reduction of system power consumption by allowing the system to reconfigure the sensor resolution to 480p compared with downsampling 1080p to 480p, as measured in a cloud-based offloading workload running on a Jetson TX2 board.

As a result, the "Banner" media framework 101 unlocks unprecedented capabilities for mobile vision applications to dynamically reconfiguring sensor resolutions to balance the energy efficiency and task accuracy tradeoff.

As noted above, mobile vision systems should be able to benefit from the ability to situationally sacrifice image resolution to save system energy when imaging detail is unnecessary. However, as depicted by the system 100 of FIG. 1A, any change in sensor resolution leads to a substantial pause in frame delivery when utilizing conventional platforms between the time of the resolution request 105A and 105B and the newly requested image resolution being effectuated by the system 100.

For example, with reference to FIG. 1A, such reconfiguring sensor resolution in Android OS prevents the application from receiving frames for about 267 ms of the vision data stream, the equivalent of dropping 9 frames when working at 30 FPS from the vision processing pipelines.

Referring to FIG. 1B, the "Banner" media framework 101 completely eliminates 120 frame-to-frame latency, thus allowing for seamless multi-resolution frame capture. The "Banner" media framework 101 further enables and achieves the minimum end-to-end reconfiguration latency, fundamentally bounded by the pipeline latency of frame readout.

Because of the unavailability of open-source camera drivers and camera host drivers for Android devices, the "Banner" media framework 101 is implemented in the Linux kernel on top of its camera host driver with a demonstrated efficacy and realization of energy savings within the Linux V4L2 framework when running three workloads on a Jetson TX2 board, including display only, cloud-based offloading, and marker-based pose estimation.

Experimental results confirm that the "Banner" media framework 101 completely eliminates 120 frame-to-frame latency, even for workloads operating at 30 FPS. Furthermore, the "Banner" media framework 101 creates a 54% reduction in end-to-end reconfiguration latency, from an exemplary 226 ms to 105 ms.

The reduction in reconfiguration latency results in a 49% power consumption reduction by reconfiguring the resolution from 1080p to 480p comparing with computationally downsampling 1080p↓480p, measured on a Jetson TX2 board.

In such a way, the "Banner" media framework 101 operates as a rapid sensor reconfiguration framework that eliminates 120 frame-to-frame latency and halves end-to-end reconfiguration latency with demonstrated effectiveness of reconfiguring sensor resolution dynamically to improve power efficiency for vision tasks comparing with downsampling.

Altogether, the "Banner" media framework 101 unlocks previously infeasible classes of vision algorithms that can balance the resolution-based energy efficiency and accuracy tradeoffs to maximize the performance in a variety of vision tasks.

Figure 2A:
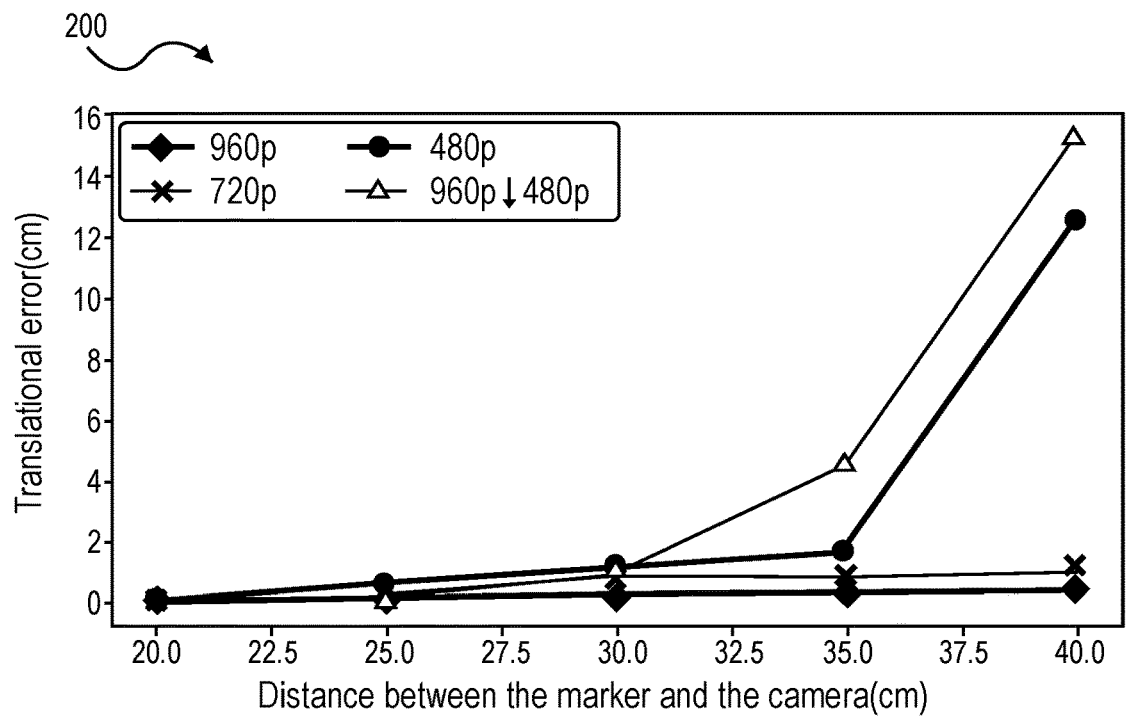
FIG. 2A depicts experimental translational error (cm) results for the distance between the marker and the camera (cm), in accordance with embodiments of the invention.

FIG. 2A depicts experimental translational error (cm) results 200 for the distance between the marker and the camera(cm), in accordance with embodiments of the invention.

Figure 2B:
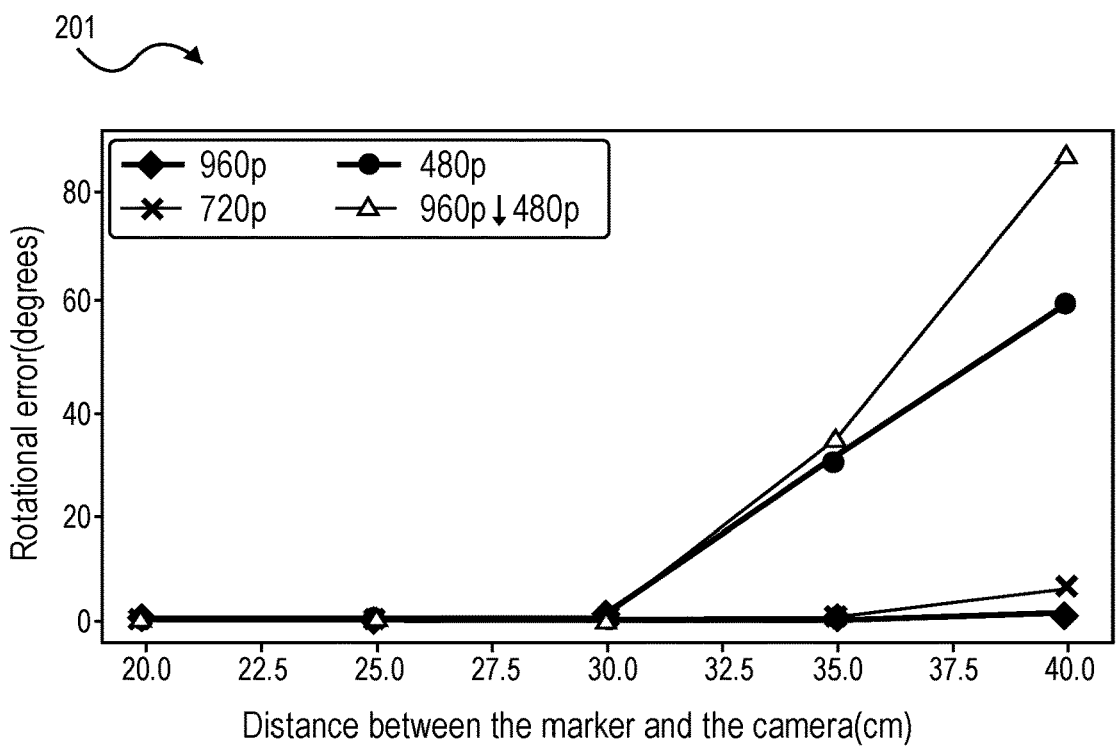
FIG. 2B depicts rotational error (degrees) results for the distance between the marker and the camera(cm), in accordance with embodiments of the invention.

FIG. 2B depicts rotational error (degrees) results 201 for the distance between the marker and the camera(cm), in accordance with embodiments of the invention.

Figure 2C:
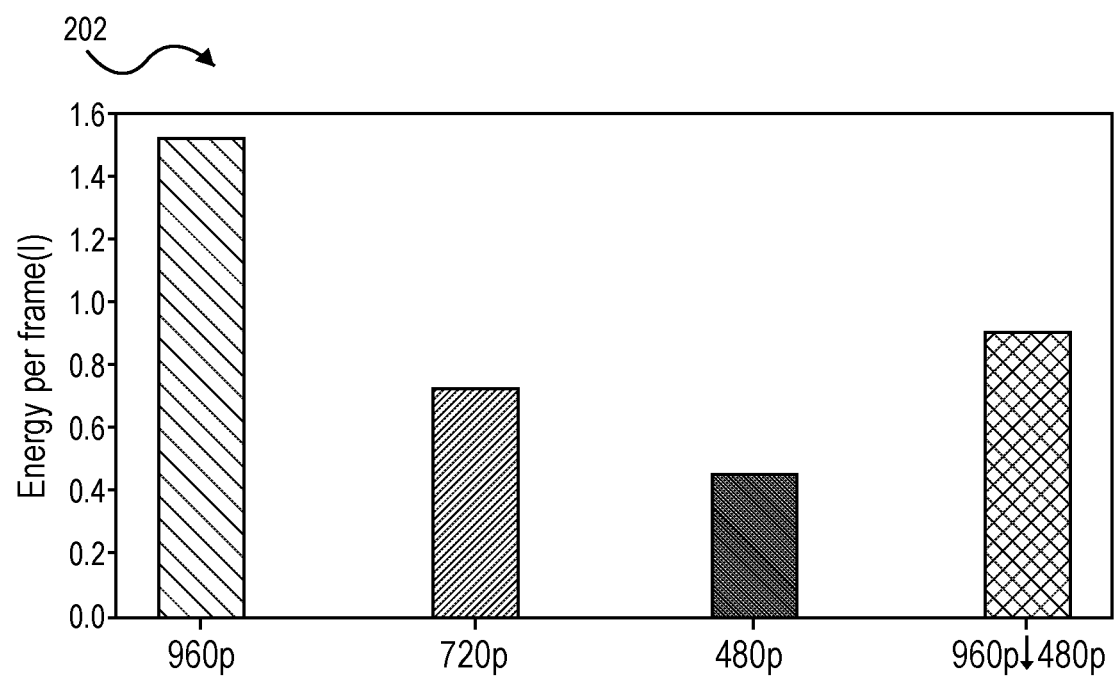
FIG. 2C depicts energy per frame (J) results for the various sampling rates, in accordance with embodiments of the invention.

FIG. 2C depicts energy per frame (J) results 202 for the various sampling rates, in accordance with embodiments of the invention.

With regard to FIGS. 2A, 2B, and 2C, results for an experimental marker-based pose estimation case study of task accuracy (rotational and translational error) can be maintained and energy efficiency (energy per frame) can be improved by 70% if sensor resolution is reconfigured from 960p to 480p when the distance between the marker and the camera is reduced from 35 cm to 20 cm.

Case Study For Resolution-Driven Tradeoffs: Experimental results from a case study around a marker-based pose estimation application running on a Moto Z mobile phone are depicted. Marker-based pose estimation forms the foundation for many AR frameworks, including Vuforia, ARCore, and ARKit for image-based tracking. Exploration of marker-based pose estimation permits analysis of the resolution-based energy and accuracy tradeoff in mobile vision tasks. The pose estimation application uses an ORB (Oriented FAST and Rotated BRIEF) feature detector, Flann-based matcher, and Perspective-n-Point algorithm to detect keypoints in an image frame, to match keypoints with the model descriptors, and to estimate the position of the virtual camera against the physical environment respectively on a frame-to-frame basis.

The energy efficiency is characterized by power traces from the Trepn Profiler and the number of frames processed per second for different resolutions. To evaluate task accuracy, MSE (Mean Square Error) rotation and translation vector errors were compared with the "ground truth" from the highest resolution.

It is known that a distance and viewing angle between the camera and the marker needs to be actively reconfigured in terms of resolution to balance efficiency and performance of the image sensor.

Similarly, as shown in FIGS. 2A, 2B, and 2C, reconfiguring the image sensor from 960p to 480p while the image sensor is approaching the marker from 35 cm to 20 cm, the task accuracy can be maintained and a 70% of energy efficiency improvement can be achieved.

As an alternative to changing sensor resolution, the system can computationally downsample the frames to reduce the computational workload of the vision algorithm. However, also shown in FIGS. 2A, 2B, and 2C, capturing with 480p is almost 50% more energy efficient than computational downsampling from 960p to 480p.

Consequently, reconfiguring the sensor resolution (as opposed to downsampling) is the most viable way to balance the resolution-based energy efficiency and task accuracy tradeoff for mobile vision tasks. However, as noted above, sensor resolution reconfiguration has been limited in previously known solutions due to the substantial latency penalty. Refer again to the frame-to-frame latency 110 at FIG. 1A induced pursuant to a resolution reconfiguration request (e.g., as depicted by elements 105A and 105B).

FIG. 3 provides a table 300 listing various time-expensive operations and their average cost in milliseconds to execute with current sensor resolution reconfiguration procedures.

In particular, current sensor resolution reconfiguration procedures require, on average, 75 ms to execute a stop streaming reconfiguration request, 31 ms to execute an initialize device reconfiguration request, and 72 ms to execute a start streaming reconfiguration request.

User applications request different resolutions on top of the Video4Linux2 (V4L2) framework and the V4L2 framework provides APIs for applications to manipulate cameras on Linux. Similar sequential sensor reconfiguration patterns are observed in other video frameworks, including Libargus and OpenMAX. However, of these, V4L2 is the most predominant video framework, with continued support. V4L2 is commonly used by almost all Ubuntu desktop and Android devices built upon the Linux system.

Reconfiguration is a sequential process: In V4L2, image sensor resolution reconfiguration follows a strictly sequential procedure. This sequential procedure leads to a substantial amount of end-to-end and frame-to-frame reconfiguration latency, which impedes the ability for applications to utilize resolution-based energy tradeoffs as the application designers seek to avoid degrading application performance. Therefore, evaluations utilizing a V4L2 implementation on an NVIDIA Jetson TX2 board with an ON Semiconductor AR0330 sensor were performed to demonstrate the benefits attainable through use of the "Banner" media framework as described herein.

V4L2 System Architecture: In the V4L2 framework, there are three main driver modules that collaborate to provide camera services. The camera host driver, which communicates with the camera controller, is responsible for ensuring proper input and output format for frame data flowing between camera and memory. The video buffer driver is responsible for allocating and deallocating buffers with proper sizes for specific resolution requests. The camera driver, which communicates with camera hardware only, is responsible for setting up the camera hardware for the requested output. These drivers exist as different modules in current V4L2 framework. The application interacts with these drivers by using system calls (ioctl).

The application uses a pair of frame buffers to store captured frames and provide them to the application for processing. The buffer ownership transfer is realized by dequeuing and queuing buffers between the application and sensor. The application dequeues a buffer when the capture is completed by the image sensor.

The application queues a buffer back for sensor capture after the processing on it is done, the application relinquishes control of the buffer. Depending on the needs of the imaging pipeline, the application can require more buffers, such that multiple pipeline stages can simultaneously address buffers. All buffers ready for applications to read are stored in the camera host. Typically, only one buffer is transferred to the application at a time.

The V4L2 framework uses a sequence of steps to reconfigure sensor operation, with such a process being depicted below, as follows:

1. The application sends a resolution request while the camera is capturing.
2. ioctl (VIDIOC_STREAMOFF) turns off current working streams, which takes approximately 75 ms.
3. Buffers are unmapped and deallocated, which takes only several milliseconds.
4. ioctl (VIDIOC_S_FMT) sets the sensor's output format, which takes only several milliseconds.
5. ioctl (VIDIOC_REQBUFS) and mmap ( ) request, allocate, and map new sets of buffers, taking 31 ms.
6. ioctl (VIDIOC_STREAMON) sets the input and output format of the channel and start the video stream, which takes around 72 ms.
7. The first frame at a new resolution is returned after a pipeline latency, typically several frame times later, depending on the pipeline depth.

Referring again to FIG. 3, the latency costs of several expensive operations in the sensor resolution reconfiguration procedure are depicted as specifically measured on the TX2/AR0330 setup.

Resolution synchronization creates latency: Throughout the reconfiguration process, there are several strict resolution synchronizations among the camera host driver, the video buffer driver, and the camera driver, each of which introduces a substantial reconfiguration latency.

First, resolution synchronization between video buffer driver and camera driver is established by requesting buffer size based on specific sensor format. This synchronization ensures that there will be enough frame buffer space to hold complete frames. If the syscall ioctl (VIDIOC_S_FMT) is called to set the sensor resolution, ioctl (VIDIOC_REQBUFS) and mmap ( ) also need to be called for a new set of buffers.

Second, resolution synchronization between camera host driver and camera driver is established by updating the camera driver host state based on the camera's format. If ioctl (VIDIOC_S_FMT) is called to set the sensor resolution, the input state of the camera host driver also needs to be reconfigured. This synchronization ensures that the video input module on board has the proper format to receive frames flowing from the camera.

Third, the previous two synchronizations forces a resolution synchronization between the camera host driver and video buffer driver. That is, if the system requires a new set of buffers, the output state of the camera host driver also needs to be reconfigured.

By synchronizing resolution among these drivers, the camera service ensures correct capture, delivery, and rendering of image frames. But this strong resolution coupling among drivers creates bottlenecks. For instance, if an application requests a new resolution, the entire seven (7) step re-configuration procedure described above will be invoked, creating substantial latency.

Figure 4:
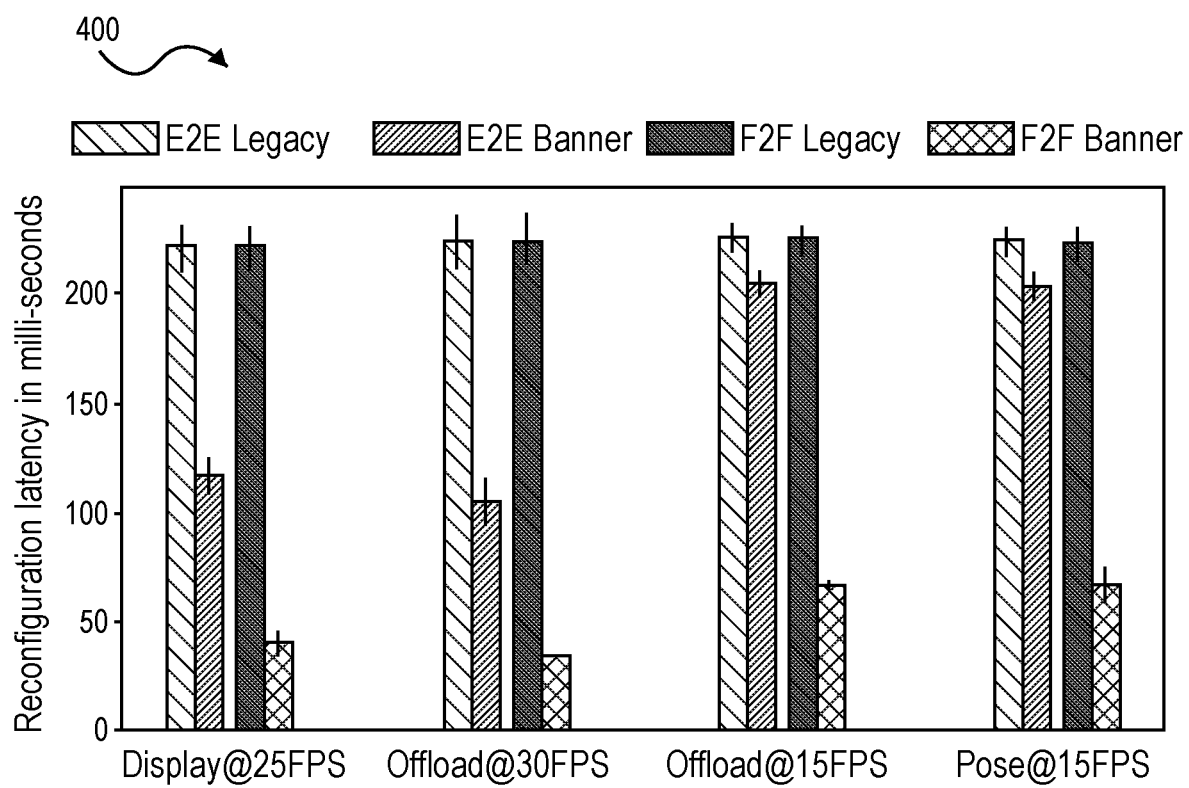
FIG. 4 provides a chart depicting how the "Banner" media framework reduces end-to-end (E2E) resolution reconfiguration latency and removes frame-to-frame (F2F) latency in all three workloads comparing with legacy in V4L2 framework, in accordance with described embodiments.

FIG. 4 provides a chart 400 depicting how the "Banner" media framework reduces end-to-end (E2E) resolution reconfiguration latency and removes frame-to-frame (F2F)

latency in all three workloads comparing with legacy in V4L2 framework, in accordance with described embodiments.

Reconfiguration latency drops frames: As shown here, the overall end-to-end reconfiguration and the frame-to-frame latency are both about 230 ms in the legacy V4L2 framework, as we measured on the TX2/AR0330 system. For a camera running at 30 FPS, a 230 ms frame-to-frame reconfiguration latency is equivalent to the system dropping 8 camera frames. In addition, the legacy V4L2 framework abandons all captured frames that are stored in buffers once the application requests a new sensor resolution. Thus, depending on how many buffers are requested by the application (N), the number of frames dropped could be N+8.

Resolution reconfiguration latency manifested on all devices tested. End-to-end resolution reconfiguration latency measured in Android and iOS devices both consume about 400 ms. Therefore, what is needed is a fast sensor resolution reconfiguration solution which may be utilized at the media frameworks so that frame-critical computer vision applications on top of them can frequently reconfigure the sensor resolution to improve energy efficiency.

Thus, design considerations utilized by the "Banner" media framework are described herein.

Preserve the pipeline of existing frames: Frames already captured and stored in the pipeline are still meaningful. While the legacy V4L2 framework abandons those frames to fulfill the new resolution request immediately. On the contrary, Android OS will issue the new resolution request only after pipelined frames are processed and delivered properly. For some visual tasks—including marker-based pose estimation—every frame is critical to task performance. The sensory data should be continuous, that is to say, frame drop is unacceptable. Therefore, the "Banner" media framework maintains current streams while reconfiguring the sensor for new resolution.

Resolution change should be immediately effective in the next capture: Sensor register change can be effective in the next capture, as is done for setting up different exposure time for consecutive capture requests in HDR mode. Therefore, the "Banner" media framework reconfigures related sensor registers immediately and asynchronously once there is a new resolution request, thus allowing applications to expect and utilize the prompt resolution change.

Minimize synchronization across the video system stack, while ensuring correct sensory data: Resolution synchronizations among different driver modules lead to repeated sequential reconfigurations every time there is a new resolution request which causes huge amount of latency. In addition, resolution synchronizations trigger some expensive and redundant system calls, including mmap( ) As long as the application has determined or otherwise knows the resolution of the frames it is processing and the sensor knows the resolution for each frame it is capturing, the data will be correctly delivered and interpreted. Therefore, the "Banner" media framework negates any buffer size synchronization between the sensor and the application as being wholly unnecessary. Accordingly, memory management can be oblivious to format.

Given the above design considerations for the "Banner" media framework, the resolution reconfiguration latency problem in legacy V4L2 frameworks is addressed by providing, via the "Banner" media framework, a fast sensor resolution reconfiguration framework that can provide frames continuously, even between two frames at different resolutions. While the "Banner" media framework is described in the context of interoperating with the V4L2 framework, the underlying concepts may be utilized by any and all media frameworks. Compared to resolution reconfiguration in conventionally known systems, the "Banner" media framework halves the end-to-end reconfiguration latency and completely removes the frame-to-frame reconfiguration latency, with no frame dropping whatsoever. As a result, the "Banner" media framework unlocks a variety of mobile vision applications that are restricted by this long resolution reconfiguration latency to control their image sensors for desired resolutions to balance the energy efficiency and accuracy tradeoffs.

In particular, the "Banner" media framework employs two key techniques: parallel reconfiguration and format-oblivious memory management. Parallel reconfiguration aims at reconfiguring the sensor while the application is processing frames for previous resolution such that the reconfiguration latency is hidden. Format-oblivious memory management aims at maintaining a single set of frame buffers—regardless of resolution—to eliminate repeated invocation of expensive memory allocation system calls.

Figure 5:
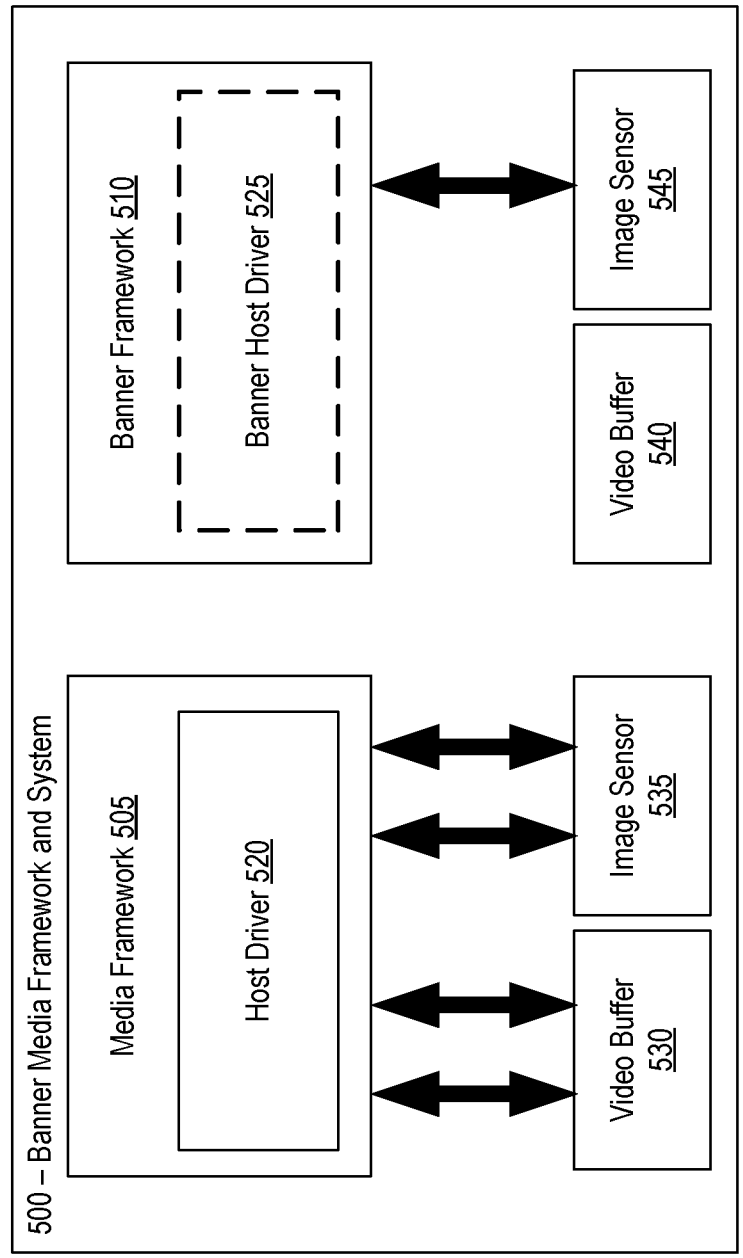
FIG. 5 depicts how the "Banner" media framework reduces system calls to reconfigure sensor resolution to one ioctl (VIDIOC_RECONFIGURE) call, instead of multiple systems calls, in accordance with described embodiments.

FIG. 5 depicts how the "Banner" media framework 500 reduces system calls to reconfigure sensor resolution to one ioctl (VIDIOC_RECONFIGURE) call, in accordance with described embodiments.

For instance, the system 500 reduces system calls to reconfigure sensor resolution to one ioctl (VIDIOC_RECONFIGURE) call rather than utilizing multiple system calls, such as: mmap( ), munmap( ), ioctl (VIDIOC_STREAMON), and ioctl(VIDIOC_STREAMOFF) calls as would be typical with previously known techniques.

System Overview: The "Banner" media framework and system 500 as depicted at FIG. 5 is a media framework 505 that allows applications to request sensor resolution reconfigurations with seamless frame delivery. The banner framework 510 of system 500 notably utilizes a banner host driver 525 to interact with the video buffer 540 driver and the camera or image sensor 545 hardware driver, as shown here whereas prior techniques require the host driver 520 of the media framework 505 interact with each of the video buffer 530 driver and the camera or image sensor 535 hardware drivers, resulting in both increased overhead as well as inducing latency. The "Banner" media framework 510 and system 500 minimizes the required number of system calls for reconfiguring the sensor resolution, thus leading to improved operational efficiency and feasibly permitting the image sensor 545 hardware to enter a lower energy consumption resolution without inducing latency or other undesirable performance issues.

Figure 6A:
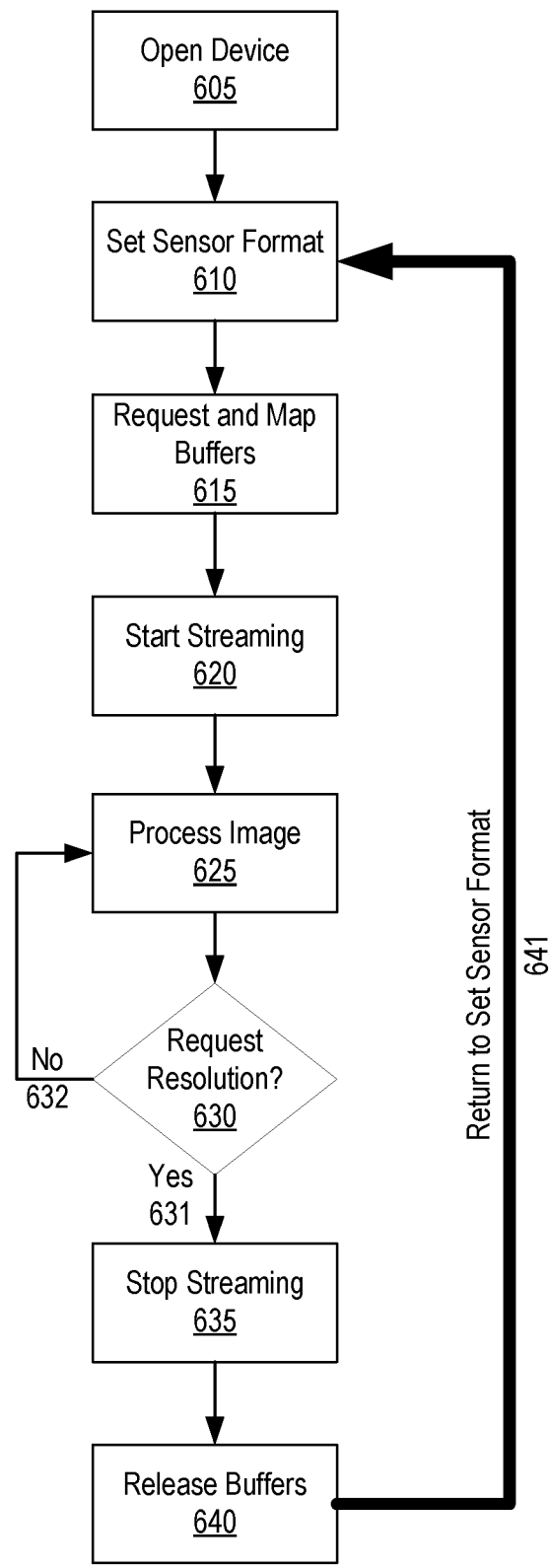
FIGS. 6A and 6B depicts prior known resolution reconfiguration in legacy V4L2 and further depicts how the "Banner" media framework and system performs resolution reconfiguration at method flow 601, in accordance with described embodiments.
Figure 6B:
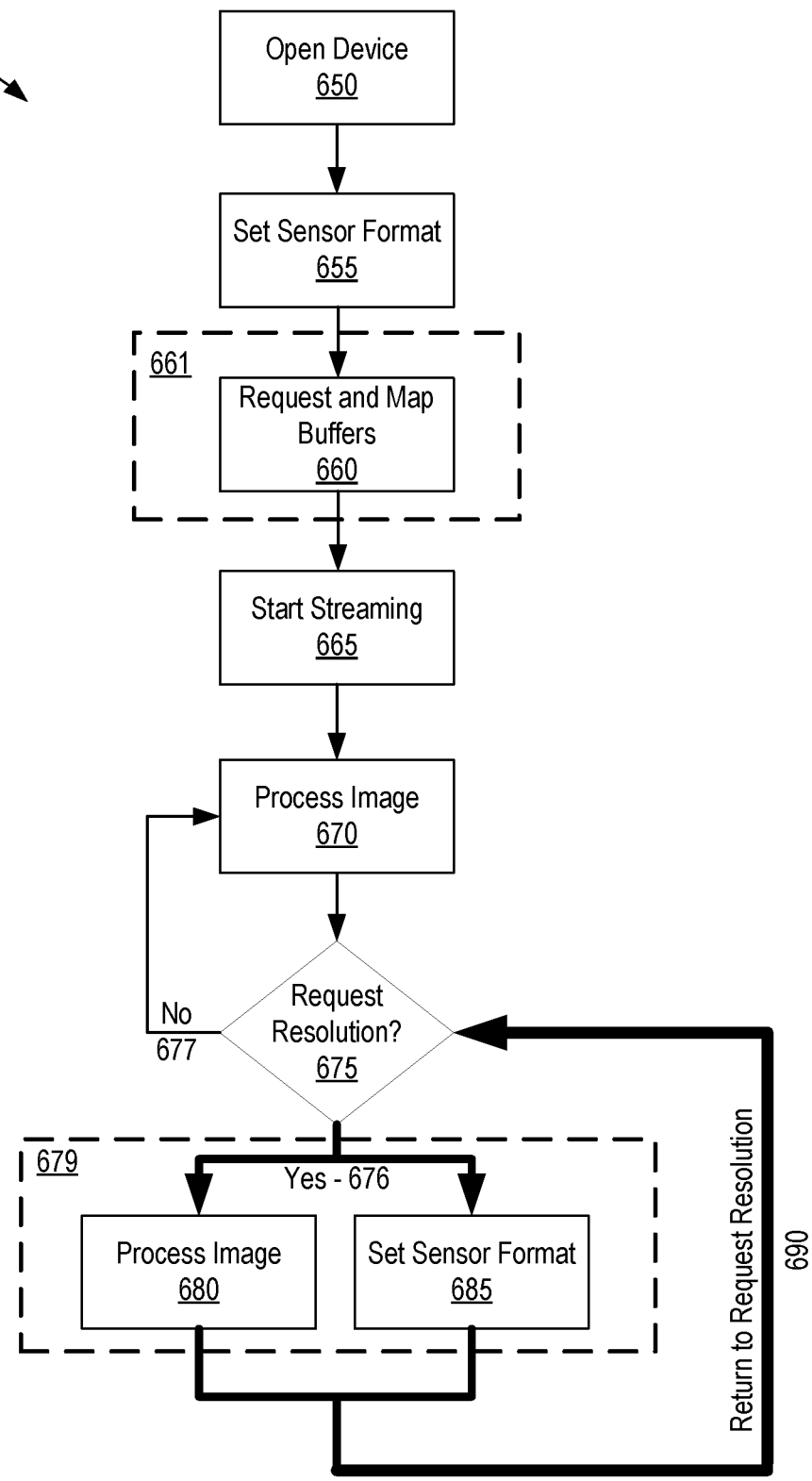

FIGS. 6A and 6B depicts prior known resolution reconfiguration in legacy V4L2 at method flow 600 of FIG. 6A and further depicts how the "Banner" media framework and system 500 performs resolution reconfiguration at method flow 601 of FIG. 6B, in accordance with described embodiments.

With reference first to FIG. 6A, method flow 600 begins at block 605, where processing sets up the sensor by opening the device at block 605 and then setting the sensor format at block 610. At block 615, processing requests and maps buffers and then proceeds to start streaming at block 620. At block 625, image processing occurs and a decision point 630 is reached to determine whether or not to request resolution. If no, then branch 632 is followed and image processing continues at block 625 iteratively checking for whether to request resolution at block 630. When ultimately it is necessary to request resolution as per the decision point 630, then the "yes" branch 631 is followed and processing advances to block 635 which stops streaming and then releases the buffers at block 640, before finally following the return to the sensor format by way of branch 641, returning processing to block 610 where processing again resumes by setting the sensor format, thus inducing the latency.

Conversely, as may be observed with respect to the method flow 601 at FIG. 6B, while processing initializes in a similar manner by setting up the device at block 650 where processing opens the device and then advances to set sensor format at block 655, further processing is distinguished from prior known methodologies.

With reference again to FIG. 6B, the rapid sensor resolution reconfiguration procedure via the "Banner" media framework is provided by method flow 601, in which processing, starting the stream, the system sets up the sensor, the sensor host, and the buffer with the highest supported resolution in a sequential procedure just like the V4L2 framework. However, unlike the conventional solution as depicted at FIG. 6A, after the application requests a new resolution, the "Banner" media framework process as depicted at FIG. 6B will not go through all steps in the sequential procedure again, thus, it will not be necessary to return to the call-out block 661 which would normally be subject to iteration due to the return call of prior methodologies, which results in the frame-to-frame latency.

Instead, the "Banner" media framework maintains the stream without reallocating buffers at block 660 and then asynchronously reconfigures the sensor in parallel in only one ioctl call.

Consequently, frames at the new resolution will be returned after reading out N frames, as determined by the number of buffers requested, already captured with previous resolution. Resolution reconfiguration in the "Banner" media framework is therefore rapid and continuous, permitting application of the process without any frame drop.

Thus, further processing continues at method flow 601 by starting the streaming at block 665, and then proceeding to processing images at block 670, with the decision point 675 then being reached. So long as there is no resolution request, the "no" branch 677 is followed, returning processing to processing images at block 670, until ultimately a request resolution 675 decision point results in following the "yes" branch 676, in which case processing advances in parallel to both blocks 680 for processing an image and 685 for setting the sensor format, with processing occurring simultaneously.

Next, rather than returning to processing 661 for re-allocating buffers, because only one ioctl call is needed, further processing follows branch 690 to return to the request resolution decision point 675, and then iterates through bocks 680 and 685 again in parallel so long as necessary, as is indicated by the iterative processing phase 679.

Upon request, stop capturing processing and closing of the camera processing (blocks not shown) follow the same sequential procedure in V4L2 framework for the sake of enhanced compatibility.

Figure 7:
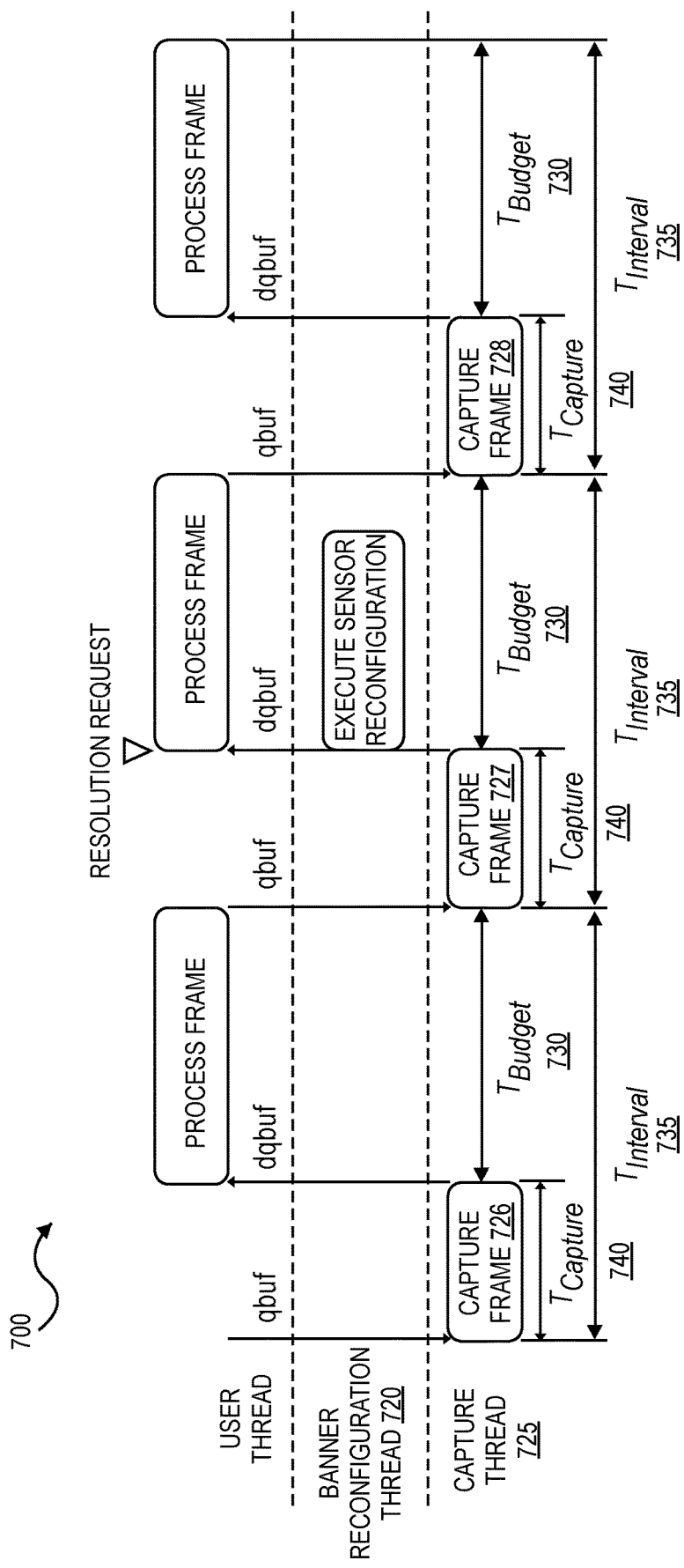
FIG. 7 depicts how the "Banner" media framework reconfigures sensor resolution in parallel with application processing frames in the reconfiguration timing budget, which is a function of frame interval and capture time, such that reconfiguration latency is hidden, in accordance with described embodiments.

FIG. 7 depicts how the "Banner" media framework 700 reconfigures sensor resolution in parallel with application processing frames in the reconfiguration timing budget, which is a function of frame interval and capture time, such that reconfiguration latency is hidden, in accordance with described embodiments.

According to one embodiment, the "Banner" media framework is built by modifying the V4L2 media framework in the upstream Nvidia Tegra TX2 Linux kernel 4.4, L4T 28.2.1. In this implementation, the "Banner" media framework realizes rapid sensor resolution reconfiguration through only one ioctl call.

Parallel Reconfiguration: Resolution reconfiguration in the current V4L2 framework follows a strictly sequential procedure. This sequential reconfiguration procedure introduces both a substantial end-to-end reconfiguration latency and a substantial frame-to-frame reconfiguration latency. Conversely, the "Banner" media framework implements sensor resolution reconfiguration completed in parallel while the application is processing frames. By doing so, the frame-to-frame resolution reconfiguration latency is fully hidden and the application suffers no performance degradation, thus realizing significant processing efficiencies and permitting power conservation through use of lower resolutions when permissible without being subjected to the reconfiguration request latency penalties incurred by prior known systems.

To achieve this, a parallel reconfiguration module is designed based on three considerations. First, the sensor is not always busy; there is an idle time between captures. Second, the reconfiguration thread cannot be interrupted, otherwise the end-to-end latency will be increased. Dequeuing a buffer signals a ready capture and queuing a buffer signals the next capture. The "Banner" media framework enables the system to find the right time to reconfigure the sensor. Third, reconfiguration itself takes time, due to sensor driver implementations and sensor hardware limitations.

Accordingly, with the "Banner" media framework, thread-level concurrency addresses the first and second considerations, while a reconfiguration timing budget can address the second and third considerations within the "Banner" media framework. Altogether, the "Banner" media framework schedules the right time via the Banner reconfiguration thread 720 so as to reconfigure the sensor and trigger the next capture via capture thread 725. The parallel reconfiguration strategy is thus shown here at FIG. 7.

Thread-level concurrency: The crux of the parallel reconfiguration is to utilize thread-level concurrency to reconfigure sensor resolution. In the conventional V4L2 framework, in addition to a main thread, there is a capture thread 725 responsible for capturing frames (e.g., 726, 727, 728, etc.). This capture thread is frozen until it is woken up by the application queuing a buffer for frame capture. The capture thread and the main application thread process in parallel. Although the sensor is busy capturing frames when the capture thread is awake, it is free for reconfiguration while the capture thread is frozen.

Conversely, for the "Banner" media framework, a reconfiguration thread works in parallel with the application thread. This thread processes reconfiguration requests while the application processes frames and the capture thread is frozen. The reconfiguration thread 720 and the main thread 725 are "joined" before they wake up the capture thread for the next capture in the "Banner" media framework while utilizing atomic read/write to ensure thread safety.

Reconfiguration timing budget: The "Banner" media framework reconfiguration thread does not reconfigure the sensor when the capture thread is active. Therefore, a resolution reconfiguration timing budget 730 is defined for the reconfiguration thread 720 to work with. Such a resolution reconfiguration timing budget $T_{budget}$ 730 in Equation 1 as a function of frame interval $T_{interval}$ 735 and capture time $T_{capture}$ 740. Further defined is $T_{interval}$ the interval between consecutive frame captures—defined by the application as the interval between two consecutive ioctl (VID- IOC_QBUF) calls from the application. The $T_{interval}$ 735 is typically held stable to ensure good user experience. The term $T_{capture}$ 740 varies from frame to frame, influenced by the capture parameters such as the exposure time and resolution. $T_{budget}$ 730 is equal to frame interval $T_{interval}$ 735 minus the required capture time $T_{capture}$ 740.

$$T_{budget} = T_{interval} - T_{capture} \qquad \text{Equation 1}$$

Notably, sensor resolution reconfiguration is finished in the reconfiguration timing budget 730 such that the reconfiguration thread 720 is not interrupted by the wake up of the capture thread 725. Otherwise, capture at the new resolution will be delayed by another capture with the old resolution, which causes both end-to-end and frame-to-frame reconfiguration latency to be unpredictable.

With use of the "Banner" media framework, it is observed that the reconfiguration timing budget is long enough such that the reconfiguration latency can be completely hidden by the main application thread. That is, the frame-to-frame latency is eliminated. Seen from the application side, the frame rate is stable in the "Banner" media framework even between two frames at different resolutions. The "Banner" media framework can therefore maintain more than 30 FPS for an offloading application with only 10 ms reconfiguration timing budget.

According to a particular embodiment, if an application operates at an unstably fast frame rate, then the "Banner" media framework will delay the delivery of the frame after the resolution request. For example, this would be the case if the application performs a memcpy of the frame to a memory location and immediately queues the buffer for a next capture. Still, in this case, the "Banner" media framework would improve the reconfiguration latency over the legacy V4L2 framework, which would delay frame delivery while executing the full reconfiguration procedure—complete with memory allocation.

Figure 8:
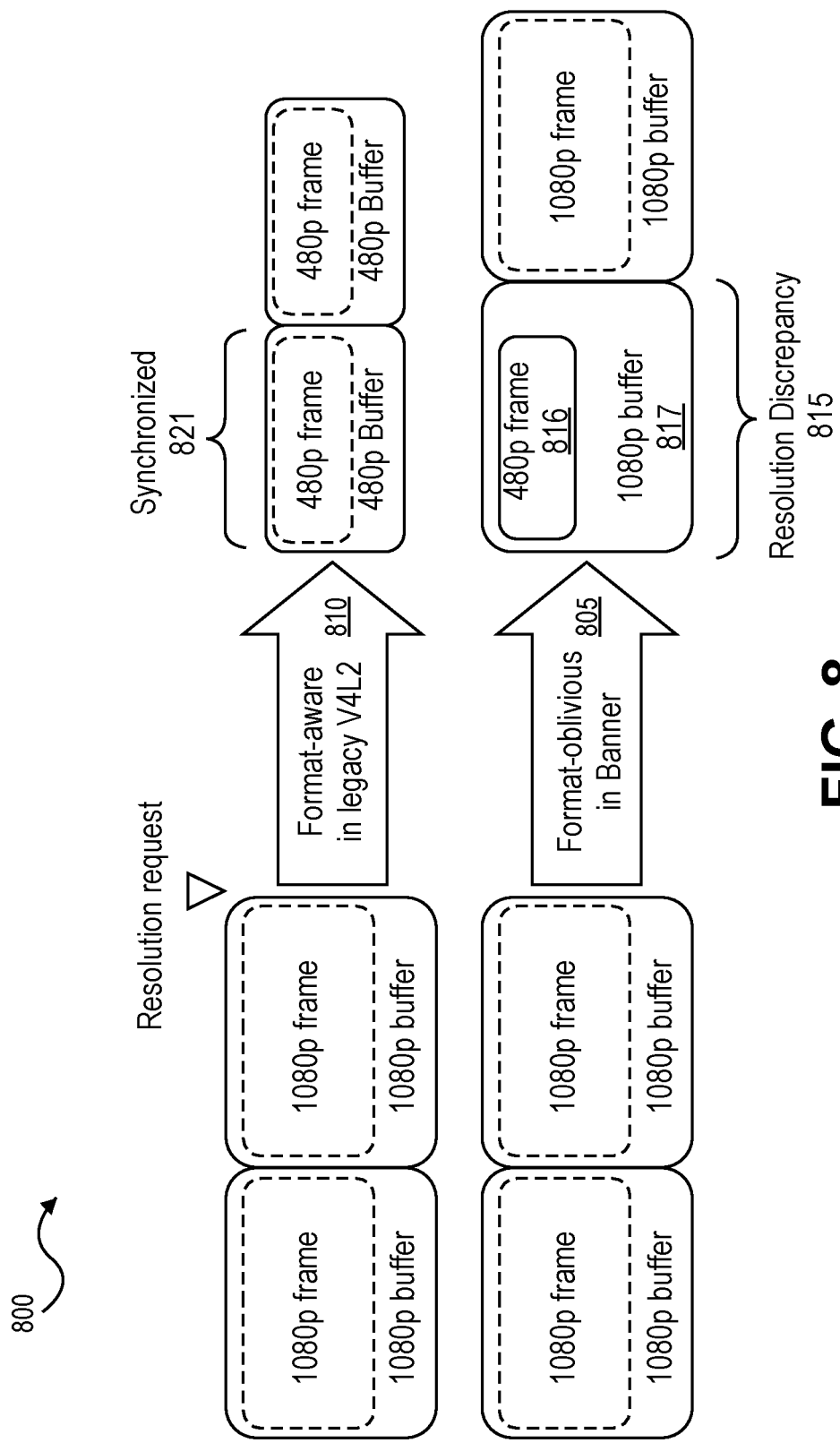
FIG. 8 depicts that, after a resolution request, format-oblivious memory management in the "Banner" media framework reuses buffers previously allocated and stores newly configured frames, despite potential format mismatch, in accordance with described embodiments.

FIG. 8 depicts that, after a resolution request, format-oblivious memory management 800 in the "Banner" media framework reuses buffers previously allocated and stores newly configured frames, despite potential format mismatch, in accordance with described embodiments.

Format-Oblivious Memory Management: The conventional V4L2 framework synchronizes frame buffer resolutions 821 across all of its modules via a format-aware methodology 810. Buffers are requested and mapped for a determined resolution before the camera can even start capturing. If the application requests another sensor resolution, the V4L2 framework stops current streams, releases previous frame buffers, and allocates a fresh set of buffers. Thus, synchronizing the format can be very expensive for the resolution reconfiguration procedure.

Conversely, the "Banner" media framework utilizes a format-oblivious memory management 805 that removes resolution synchronization in the resolution reconfiguration procedure. Format-oblivious memory management reuses previously allocated buffers to store frames with different formats, as shown here at FIG. 8. This technique reduces the end-to-end reconfiguration latency and frame-to-frame reconfiguration latency by avoiding unnecessary system calls.

One-time buffer allocation: Instead of allocating frame buffers every time the application requests a new resolution, format-oblivious memory management only allocates buffers once when initializing the camera. To support all formats, the system utilizing the "Banner" media framework can allocate for the highest supported resolution by the camera for reuse for any resolution.

Reusing buffers brings several benefits. First, the previously frequent memory mapping for new sensor resolution is now completely avoided; ioctl (VIDIOC_REQBUFS) and mmap ( ) are avoided. The system call mmap ( ) is very time consuming as described above. Second, current video streams are not discarded. The system calls for turning on and off the video stream—ioctl (VIDIOC_STREAMON) and ioctl (VIDIOC_STREAMOFF) respectively—are avoided through use of the "Banner" media framework. Both of them consume tens of milliseconds. Third, since there is only one format at the receiving end, the system doesn't need to set the output state of camera host driver for reconfiguration.

Format-oblivious frame delivery: Format-oblivious memory management 805 delivers the frame to the application not based on the payload calculated by the sensor format, but based on how many bytes are used. When the application requests another resolution, the "Banner" media framework passes the format information to the sensor driver and the host driver appropriately. As the system needs to maintain the current pipeline of frames, there will be a resolution discrepancy 815 (e.g., 480p frame at element 816 vs. the 1080p buffer at element 817) among the frames already captured and the frames to be captured in the new configuration.

The "Banner" media framework solves this problem by delivering the frames according to how many bytes are used. The sensor will provide enough format information for the application to interpret frames. So long as the application and sensor knows the format at the appropriate times, the frame can be correctly captured, delivered, and interpreted through use of the "Banner" media framework.

Because modern mobile systems and phones have at least 1 GB of RAM, any additional memory allocation is not anticipated to become a limiting factor through the use of the "Banner" media framework. For example, when configured for 480p resolutions, the frame buffer will occupy the memory footprint of a 1080p frame buffer (6 MB for 3 frames). However, the additional buffer allocation does not increase system power, as DDR power consumption is governed by data rate, not allocation, which was confirmed through experimentation.

According to a particular embodiment, the "Banner" media framework is built by modifying the V4L2 media framework in the upstream Nvidia Tegra TX2 Linux kernel 4.4, L4T 28.2.1. In this implementation, the "Banner" media framework realizes rapid sensor resolution reconfiguration through only one ioctl call.

Parallel Reconfiguration: The "Banner" media framework reconfiguration policy utilizes idle time in kernel space to change the format of an image sensor. After capturing and processing a frame, the kernel host driver returns to an idle state until the next capture. Knowing that the kernel is idle, the "Banner" media framework uses this time to send commands that change the sensor's format.

The "Banner" media framework also performs any state changing on the host driver side towards a resolution change. This sufficiently performs the operations of reconfiguring the sensor resolution.

With the "Banner" media framework, resolution reconfiguration is initialized by an ioctl (VIDIOC_RECONFIGURE) call, from the application which will set a sensor resolution format that is passed from user space to the host driver object. The "Banner" media framework will then immediately spawn a kernel thread to perform the reconfigure operation.

The "Banner" media framework uses single thread to perform the reconfiguration as the overhead of spawning multiple times was observed to make reconfiguration slower overall.

Setting host driver states is an immediate operation with the "Banner" media framework. The only part of the reconfiguration process that takes significant time is configuring the sensor device hardware.

Configure sensor device: The sensor configuration call changes the state of the camera device. The camera device module then controls the image sensor directly by making I²C or other bus calls. The time that configuring the sensor takes will vary from sensor to sensor as each sensor will have a different protocol for setting sensor format.

Update Host Driver State: Updating the host driver's state with the "Banner" media framework will prepare it to capture frames at a new resolution. The host driver state must be updated immediately after the sensor is reconfigured, as the next captured frame will be at the sensor's new resolution.

If this is not done, the next frame will be returned with the old resolution and be interpreted improperly at the application level. The next ioctl (VIDIOC_QBUF) operation will use the settings set here to capture a frame. This will also set the input for the frame size of buffers as well as the values required to calculate the size of buffer, so that the application knows how many bytes to read for the frame.

Format-Oblivious Memory Management: An important optimization implemented by the "Banner" media framework is to reuse memory buffers, as making mmap ( ) and munmap ( ) calls takes tens of milliseconds varying based on frame size. When initializing the V4L2 device, after calling ioctl (VIDIOC_REQBUFS), the buffers returned should be allocated to the maximum frame size that will be used by the application.

While reusing the buffers does consume extra memory when the frame size is smaller than maximum, it allows the "Banner" media framework to save reconfiguration latency; the mmap ( ) and munmap ( ) process do not need to be repeated. The mmap ( ) allocates shared memory between the camera device and the application level. Shared memory allows the camera device driver to write frames into the buffer and the application to read from the same address in memory. The shared memory will contain information about the bytes used inside of the buffer, for example, for the state, if the buffer is ready to be read from the application level, and the raw frame data. The user application will use the buffer state to know the length of bytes to read out into its own buffer.

User Application Library Level: The "Banner" media framework exposes the sensor resolution reconfiguration API to the user application as a V4L2 library call. User applications can call the Banner API, just as they use V4L2 to start video streaming. Exemplary code tested opens the camera device and initializes all memory needed for capture, as per the V4L2 specification. The code then starts a capture loop that will run until a frame count has passed. This capture loop uses the select system call to wait until the video buffer driver signals that the buffers are ready for reading. The application takes ownership of the buffer by calling ioctl (VIDIOC_DQBUF) and then copies the shared memory to an application buffer before returning it with ioctl (VIDIOC_QBUF).

When the application initializes the camera, it counts the number of frame buffers allocated. This count is saved for future reference, as it is equal to the number of frames in any given pipeline. Immediately after a select, on any frame, the application calls ioctl (VIDIOC_RECONFIGURE) with the reconfigure resolution target. After a reconfiguration call, the application starts counting frames returned in the main-loop until the captured frames at previous resolution are read out; at this point, the code reconfigures the application's resolution to the new resolution. From this frame onward the frame returned by driver will be the new resolution.

For simplicity, these steps may be simply wrapped into a "Banner" media framework library API, which can perform these operations in user space.

OpenCV hook: When working with the "Banner" media framework in OpenCV, raw frames are taken from the V4L2 capture. OpenCV requires frames to be in BGR format, but the V4L2 camera returns UYVY. Therefore, so as to convert frames into a format that OpenCV can manipulate, the "Banner" media framework uses a modified CUDA function from Nvidia.

The function converts YUYV to RGB, but the "Banner" media framework extends the function to convert UYVY to BGR by reordering the image input and output planes Once the "Banner" media framework has the BGR frame, it is a 1-dimensional array and still not in a form for OpenCV to work with. To fix this the "Banner" media framework calls the constructor for Mat, OpenCV's basic object for handling images.

The "Banner" media framework takes care to use the correct parameters for resolution, pixel size, plane count, and frame data. From there, the "Banner" media framework can use any OpenCV function to operate on the image, such as resize, imshow, and BFMatcher.

Figure 9:
FIG. 9 provides a table listing Power consumption (mW) of running different GPU-enabled workloads at different resolutions on a Jetson TX2 board with an ON Semiconductor AR0330 sensor, comparing between V4L2 benchmark and "Banner" media framework, in accordance with described embodiments.

FIG. 9 provides a table 900 listing Power consumption (mW) of running different GPU-enabled workloads at different resolutions on a Jetson TX2 board with an ON Semiconductor AR0330 sensor, comparing between V4L2 benchmark and "Banner" media framework, in accordance with described embodiments.

The "Banner" media framework was evaluated within the V4L2 framework on a NVIDIA Jetson TX2 board with an ON Semiconductor AR0330 sensor. This Jetson TX2 board has a Quad ARM A57 processor, roughly as powerful as a Samsung S6 Edge smartphone.

The experimental results from such an evaluation answered three questions: (i) How much reconfiguration latency did the "Banner" media framework reduce for reconfiguring sensor resolution? (ii) How much power efficiency can be improved by reconfiguring sensor resolution dynamically and rapidly with the "Banner" media framework? (iii) What does fast sensor resolution reconfiguration mean to computer vision applications?

Evaluation Methodology: To evaluate and validate the effectiveness of the "Banner" media framework for reconfiguring sensor resolution in a variety of vision tasks, three applications integrated with OpenCV were chosen. The first application only displays frames. The second application offloads frames to a desktop server through a direct connection. The third application implements the same marker-based pose estimation as described above. All three applications cycle through a set of supported resolutions: 1920×1080, 1280×720, and 640×480.

To compare the "Banner" media framework reconfiguration against computational downsampling, a OpenCV resize ( ) function was used to downscale 1080p frames to 480p (represented in the table as 1080p↓1480p). The frame-rate is set to be constant across different resolutions in all applications, bounded by the frame-rate in the highest resolution, with the help from dynamic CPU and GPU clock scaling.

Resolution reconfiguration latency was measured which includes end-to-end reconfiguration latency, and describes how long it takes for the application to receive the first new frame after a resolution is requested and frame-to-frame latency was further measured, which indicates the interval during which an application receiving no frames after a resolution is requested. Both latencies are measured by retrieving system timestamps at the application level.

Power consumption was measured and averaged in a controlled amount of time. The power consumption of several components on the Jetson TX2 retrieved from the Jetson power rail system files was also measured, including SYS_SOC which monitors the power consumption of the main Tegra core, SYS DDR which monitors the power consumption of the LPDDR4, SYS_CPU which monitors the power consumption of the ARM processor, and SYS_GPU which monitors the power consumption of the Pascal GPU.

For the experiment, 600 power samples for each run were specifically acquired and averaged.

Use of the "Banner" media framework completely eliminates the frame-to-frame latency in all three workloads and is able to halve the end-to-end reconfiguration latency, as shown above at FIG. 4. In the display workload (at 25 FPS), the average end-to-end reconfiguration latency is reduced by 47% (from 222 ms to 117 ms) and the average frame-to-frame latency is reduced by 82% (from 222 ms to 41 ms).

In the slower offloading workload (at 15 FPS), the average end-to-end reconfiguration latency is reduced by 9% (from 226 ms to 205 ms) and the average frame-to-frame latency is reduced by 70% (from 226 ms to 67 ms).

In the pose estimation workload (at 15 FPS), the average end-to-end reconfiguration latency is reduced by 10% (from 225 ms to 203 ms) and the average frame-to-frame latency is reduced by 70% (from 225 ms to 67 ms).

To further demonstrate the effectiveness of the "Banner" media framework at a faster frame-rate, a CPU-based cloud-based offloading case was added, working at 30 FPS without OpenCV and without GPU. In this case, the average end-to-end reconfiguration latency is reduced by 54% (from 226 ms to 105 ms) and the average frame-to-frame latency is reduced by 85% (from 226 ms to 34 ms).

Observations from these results include that first, end-to-end and frame-to-frame resolution reconfiguration latency are equivalent in the legacy V4L2 framework. This is because the frames stored in the capture queue are abandoned once there is a new resolution request. If those frames need to be read out and processed before the start of resolution reconfiguration—as they are in the Android OS—the end-to-end reconfiguration latency can be even larger. Second, the average end-to-end and frame-to-frame resolution reconfiguration latency in legacy V4L2 framework are stable across all three workloads because they all go through the same procedure, though they still have larger standard deviation compared to the "Banner" media framework. Third, end-to-end and frame-to-frame resolution reconfiguration latency are predictable in the "Banner" media framework because they depend on the frame-rate. In the "Banner" media framework, the first frame at a new resolution will be received after N frame intervals, where N is the number of frames already captured and stored in the buffer queue.

With the "Banner" media framework, there are three buffers requested and thus, three captures are stored for previous resolution. Therefore, the end-to-end reconfiguration latency in the "Banner" media framework is around three frame intervals. Frame-to-frame latency in the "Banner" media framework is equal to the inverse of the processing frame rate. The application will receive continuous frames at the same frame-rate without noticing the resolution reconfiguration procedure. In other words, the "Banner" media framework eliminates frame drops.

Power Efficiency Improved by the "Banner" media framework: As shown at FIG. 9, rapid sensor resolution reconfiguration with the "Banner" media framework enables a substantial power efficiency improvement.

Observations from these results include that first the resolution-based power efficiency improvement is generic to vision tasks. In each of the three evaluated workloads, the choice of sensor resolution influences the power consumption of all components onboard, including data movement, storage, and processing. Second, the power efficiency improvement is substantial as the sensor resolution drops. In legacy V4L2, the combined power consumption is reduced by 62%, 60%, and 42% as sensor resolution is reduced from 1080p to 480p, in display, offload, and pose estimation workloads respectively. Thus, the life of a mobile vision task can be significantly improved if the system allows dynamic sensor reconfiguration when it can sacrifice resolution. Third, reconfiguring sensor resolution physically is much more power efficient than other alternatives, i.e., computational downsampling. 1080p↓1480p@FPS in Table 2 shows the power consumption of downsampling 1080p frames to 480p in the legacy V4L2 framework. Comparing with reconfiguring sensor resolution physically to 480p in the "Banner" media framework, downsampling consumes 43%, 49%, and 17% more power in display, offload, and pose estimation accordingly.

Figure 10:
FIG. 10 provides a table demonstrating that power consumption (mW) is reduced by reconfiguring resolution, measured with a CPU-based cloud-based offloading workload working at 30 FPS, in accordance with described embodiments.

FIG. 10 provides a table 1000 demonstrating that power consumption (mW) is reduced by reconfiguring resolution, measured with a CPU-based cloud-based offloading workload working at 30 FPS, in accordance with described embodiments.

To further demonstrate the power efficiency improvement brought by the "Banner" media framework for reconfiguring sensor resolution dynamically, an experiment was conducted in which the sensor resolution cycles through 1080p, 720p, and 480p every 10 frames in a total of 1000 frames. This pattern was run with a CPU-based cloud-based offloading workload working at 30 FPS.

Effectiveness of Dynamic Reconfiguration: Observed from the results shown at FIG. 10, even in legacy V4L2 framework, reconfiguring sensor resolution dynamically (99x-reconf.-V4L2) can reduce 20% of the combined system power consumption comparing with constantly working at 1080p—notably, there are substantial frame drops with each reconfiguration in the legacy V4L2 system.

Meanwhile, reconfiguring sensor resolution with the "Banner" media framework (99x-reconf.-Banner) further reduces total power consumption by 9%, compared with 99x-reconf.-V4L2, without the frame drop penalty.

The power consumption of 99x-reconf.-Banner is roughly the same as constantly working at 480p. Power overhead of the "Banner" media framework as shown above at FIG. 9, comparing between the "Banner" media framework and legacy V4L2 framework, there is no obvious power overhead. Specifically, the "Banner" media framework does not consume more DDR power despite its allocation of more memory than the active resolution requires. This is because DDR power consumption is based on data rate, and not buffer size.

In such a way, the "Banner" media framework enables rapid sensor resolution reconfiguration by eliminating frame-to-frame latency and halving the end-to-end reconfiguration latency. This unlocks a more than 49% system power consumption reduction by reconfiguring the image sensor resolution from 1080p to 480p comparing with computationally downsampling to 1080p↓480p. Image resolution needs to be configured dynamically to adapt to the environmental change to maximize the power efficiency, such as the continuously changing distance between the image sensor and the marker in a marker-based pose estimation application.

The marker-based pose estimation application experiment performed the Jetson/AR0330 system reveals that the estimated pose accuracy can be maintained (±0.1 cm MSE translation vector error) even if the image resolution is reconfigured from 1080p to 720p and then to 480p as the distance between the image sensor and the marker is reduced from 40 cm to 20 cm. This results in a 28% power consumption reduction between 1080p and 720p and a 42% power consumption reduction between 1080p and 480p.

Although the "Banner" media framework does not modify the camera driver, which is often a sensitive proprietary piece of software, practice of the described embodiments may nevertheless be realized by incorporating the described methodologies into such proprietary software which will then continue to serve their identical function, despite residing outside of a media framework.

According to certain embodiments, the "Banner" media framework only involves changes in the camera host driver and exposes itself as a library call to the upper level media framework, as V4L2 does. Thus, developers can use the "Banner" media framework just as they use the V4L2 framework for video streaming. If developers want to use other media frameworks with the Banner-based host driver, they may do so by modifying the media frameworks' library.

Moreover, the "Banner" media framework can reduce the image sensor resolution reconfiguration latency even further with a good image sensor driver implementation.

Memory management: According to certain embodiments, the "Banner" media framework allocates more memory than is needed for smaller resolution. However, allocating three buffers for 1920×1080 frames with 8 bits per pixel only requires 6 MB memory. Storing 640×480 frames in them will cause memory waste but only for about 5 MB. Unused memory does not incur power overhead, as observed from experimentation. If the application still wants to utilize that memory, the "Banner" media framework's memory management is able to provide enough information.

Machine Learning Support and Optimal resolution selection algorithm: According to a particular embodiment, machine learning support is provided to use resolution-based performance and accuracy tradeoffs managed by a machine learning model. The "Banner" media framework is sufficiently generic to upper level applications such that machine learning developers may utilize the "Banner" media framework to find opportunities relying on resolution-based performance and accuracy tradeoffs.

According to certain embodiments, the OpenCV marker-based pose estimation application was evaluated by triggering the resolution change based on the physical distance between the maker and the sensor, thus utilizing a more sophisticated resolution selection algorithm, for instance, by teaching the machine to decide when to change the sensor resolution in a machine learning environment.

In such a way, when compared with traditional media frameworks, the "Banner" media framework described herein enables seamless sensor resolution reconfiguration in which there is no frame drop incurred during a resolution reconfiguration, contrary to traditional media frameworks which are not only much slower, but penalize the application via dropped frames for every resolution reconfiguration.

The "Banner" media framework therefore unlocks new classes of vision algorithms that use a resolution-based approach to improve performance and efficiency in a variety of visual tasks and may provide one of the fundamental system components of energy-efficient adaptive mobile sensing as most computer vision applications will directly benefit from the resolution-based energy, performance and accuracy tradeoff.

FIG. 11 depicts a flow diagram illustrating a method 1100 for implementing an image sensor reconfiguration framework for seamless resolution-based tradeoffs, in accordance with the described embodiments. Method 1100 may be performed by processing logic that may include hardware (e.g., circuitry, dedicated logic, programmable logic, microcode, etc.), software (e.g., instructions run on a processing device) to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the system 1200 (see FIG. 12) and the machine 1301 (see FIG. 13) and the other supporting systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 1100 depicted at FIG. 11, beginning with block 1105, there is a method performed by a specially configured system which executes via a processor and memory of the specially configured system, a method for performing a resolution reconfiguration of an image sensor without dropping frames. Such a system may be configured with at least a processor and a memory to execute specialized instructions which cause the system to perform the following operations:

At block 1110, processing logic opens an image device having the image sensor embedded therein.

At block 1115, processing logic sets the image sensor to a first sensor format.

At block 1120, processing logic requests and mapping buffers for a vision data stream from the image sensor in accordance with the first sensor format.

At block 1125, processing logic streams the vision data stream from the image sensor in accordance with the first sensor format.

At block 1130, processing logic receives a resolution reconfiguration request to change the image sensor from the first sensor format to a second sensor format.

For example, moving from an exemplary 1080p resolution to an exemplary 480p, the system improves the energy savings of the image sensor by moving less data, by computing/processing less data, and by sensing less data for the lower resolution, whilst satisfying the objectives of the application for visual imagery. For example, there may be an image marker which is large and in the near field, and so 480p is sufficient and yet, saves battery power.

At block 1135, processing logic performs a parallel reconfiguration of the image sensor, wherein the image device continues to process the vision data stream from the image sensor in accordance with the first sensor format in parallel with the image device resetting the image sensor to the second sensor format.

According to another embodiment of method 1100, performing the parallel reconfiguration of the image sensor comprises transitioning streaming of the vision data stream from the image sensor in accordance with the first sensor format to streaming the vision data stream from the image sensor in accordance with the second sensor format without dropping a single frame.

According to another embodiment of method 1100, performing the parallel reconfiguration of the image sensor comprises transitioning streaming of the vision data stream via the first sensor format to streaming of the vision data stream via the second sensor format with frame-to-frame resolution reconfiguration latency being fully hidden from any application receiving the streaming of the vision data stream from the image sensor.

According to another embodiment of method 1100, performing the parallel reconfiguration of the image sensor comprises: executing a main thread for application processing of the vision data stream from the image sensor; spawning a new reconfiguration thread to process reconfiguration requests received; and joining the main thread and the new reconfiguration thread before a capture thread for the image sensor wakes to resume capturing frames from the image sensor.

According to another embodiment of method 1100, performing the parallel reconfiguration of the image sensor further comprises: prohibiting reconfiguration of the image sensor while a capture thread is actively capturing frames from the image sensor.

According to another embodiment, method 1100 further includes: defining $T_{interval}$ as an interval between consecutive frame captures; identifying $T_{capture}$ as the time required for each frame capture; defining a reconfiguration timing budget $T_{budget}$ as a function of a frame interval $T_{interval}$, where $T_{budget}$ is equal to frame interval $T_{interval}$ minus the required capture time $T_{capture}$; and requiring the parallel reconfiguration of the image sensor to complete within the defined reconfiguration timing budget $T_{budget}$.

According to a particular embodiment, there is a non-transitory computer-readable storage medium having instructions stored thereupon that, when executed by a processor of a image device, the instructions cause the image device to perform operations including: opening the image device having an image sensor embedded therein; setting the image sensor to a first sensor format; requesting and mapping buffers for a vision data stream from the image sensor in accordance with the first sensor format; streaming the vision data stream from the image sensor in accordance with the first sensor format; receiving a resolution reconfiguration request to change the image sensor from the first sensor format to a second sensor format; and performing a parallel reconfiguration of the image sensor, wherein the image device continues to process the vision data stream from the image sensor in accordance with the first sensor format in parallel with the image device resetting the image sensor to the second sensor format.

Figure 12:
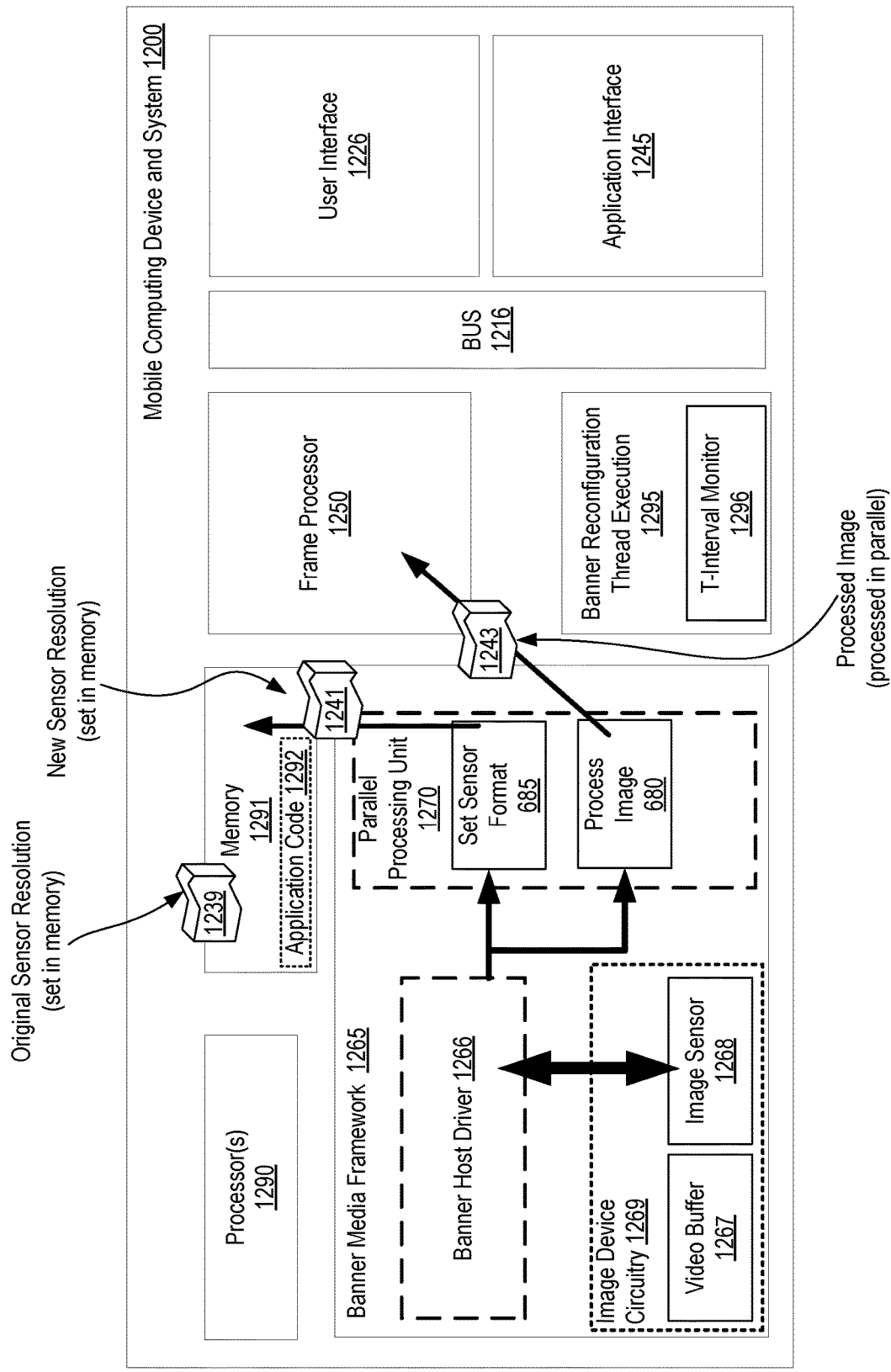
FIG. 12 shows a diagrammatic representation of a mobile computing device and system within which embodiments may operate, in accordance with the described embodiments.

FIG. 12 shows a diagrammatic representation of a mobile computing device and system 1200 within which embodiments may operate, be installed, integrated, or configured. In accordance with one embodiment, there is a system 1200 having at least a processor 1290 and a memory 1291 therein to execute implementing application code 1292. Such a system 1200 may communicatively interface with and cooperatively execute with the benefit of remote systems, such as a user device sending instructions and data, a user device to receive as an output from the system 1200 a images having been processed in different resolutions as set by the banner media framework 1265 and banner host driver 1266, etc.

According to the depicted embodiment, the system 1200, includes the processor 1290 and the memory 1291 to execute instructions at the system 1200. The system 1200 as depicted here is specifically customized and configured to implement an image sensor reconfiguration framework for seamless resolution-based tradeoffs, in accordance with disclosed embodiments.

According to a particular embodiment, the mobile computing device and system 1200 is further configured to execute instructions via the processor for implementing the image sensor reconfiguration framework for seamless resolution-based tradeoffs, utilizing at least the following components and circuitry of the system 1200. For instance, according to a particular embodiment, the mobile computing device and system 1200 includes a memory 1291 to store instructions; a processor 1290 to execute instructions stored within the memory 1291 an image device or image circuitry 1269 having an image sensor 1268 and dedicated image buffer circuitry 1267 embedded therein; in which the instructions cause the mobile device 1200 to perform operations including: opening the image device having the image sensor 1268 embedded therein; setting the image sensor 1268 to a first sensor format; requesting and mapping buffers for a vision data stream from the image sensor in accordance with the first sensor format; streaming the vision data stream from the image sensor in accordance with the first sensor format (e.g., original sensor resolution 1239 set in memory); receiving a resolution reconfiguration request to change the image sensor from the first sensor format 1239 to a second sensor format (e.g., new sensor resolution 1241 set in memory); and performing a parallel reconfiguration via the parallel processing unit 1270 of the image sensor 1268 to set the image sensor to the new sensor resolution 1241 as specified by the second sensor format, in which the image device circuitry 1269 continues to process the vision data stream from the image sensor 1268 in accordance with the first sensor format (e.g., original sensor resolution 1239 set in memory) in parallel with the image device resetting the image sensor to the second sensor format (e.g., new sensor resolution 1241 set in memory).

Thus, the set sensor format 685 function within the parallel processing unit 1270 will issue the second sensor format (e.g., new sensor resolution 1241) into memory in parallel with the process image 680 function of the parallel processing unit 1270 handling the processed image 1243 with the benefit of the frame processor 1250.

The banner reconfiguration thread execution 1295 component or function operates to monitor the T-interval via T-interval monitor 1296 so as to appropriately time the sensor reconfiguration without inducing frame-to-frame latency delay. The T-interval monitor may additional calculate the appropriate T-budget permitted for the sensor reconfiguration.

According to another embodiment of the system 1200, a user interface 1226 communicably interfaces with a user client device remote from the system and communicatively interfaces with the system via a public Internet and mobile applications may communicate with the system 1200 via application interface 1245.

Bus 1216 interfaces the various components of the system 1200 amongst each other, with any other peripheral(s) of the system 1200, and with external components such as external network elements, other machines, client devices, cloud computing services, etc. Communications may further include communicating with external devices via a network interface over a LAN, WAN, or the public Internet.

FIG. 13 illustrates a diagrammatic representation of a machine 1301 in the exemplary form of a computer system, in accordance with one embodiment, within which a set of instructions, for causing the machine/computer system 1301 to perform any one or more of the methodologies discussed herein, may be executed.

In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify and mandate the specifically configured actions to be taken by that machine pursuant to stored instructions. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1301 includes a processor 1302, a main memory 13011 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1318 (e.g., a persistent storage device including hard disk drives and a persistent database and/or a multi-tenant database implementation), which communicate with each other via a bus 1330. Main memory 1304 includes a media framework specially configured with parallel processing 1324 for implementing the image sensor reconfiguration framework for seamless resolution-based tradeoffs in support of the methodologies and techniques described herein. Main memory 1304 further includes the parallel processing unit 1323 which may include specialized hardware circuitry to implement the set sensor format and process image functions via the media framework with parallel processing 1324 unit. Main memory 1304 further includes the $T_{interval}$ monitor 1325 capable of monitoring the $T_{interval}$ and if needed, calculating $T_{budget}$. Main memory 1304 and its sub-elements are further operable in conjunction with processing logic 1326 and processor 1302 to perform the methodologies discussed herein.

Processor 1302 represents one or more specialized and specifically configured processing devices such as a microprocessor, central processing unit, or the like. More particularly, the processor 1302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1302 may also be one or more special-purpose processing devices such as an application-specific integrated circuit (ASIC), a field programmable gate array (FPGA), a digital signal processor (DSP), network processor, or the like. Processor 1302 is configured to execute the processing logic 1326 for performing the operations and functionality which is discussed herein.

The computer system 1301 may further include a network interface card 1308. The computer system 1301 also may include a user interface 1310 (such as a video display unit, a liquid crystal display, etc.), an alphanumeric input device 1312 (e.g., a keyboard), a cursor control device 1313 (e.g., a mouse), and a signal generation device 1316 (e.g., an integrated speaker). The computer system 1301 may further include peripheral device 1336 (e.g., wireless or wired communication devices, memory devices, storage devices, audio processing devices, video processing devices, etc.).

The secondary memory 1318 may include a non-transitory machine-readable storage medium or a non-transitory computer readable storage medium or a non-transitory machine-accessible storage medium 1331 on which is stored one or more sets of instructions (e.g., software 1322) embodying any one or more of the methodologies or functions described herein. The software 1322 may also reside, completely or at least partially, within the main memory 13011 and/or within the processor 1302 during execution thereof by the computer system 1301, the main memory 1304 and the processor 1302 also constituting machine-readable storage media. The software 1322 may further be transmitted or received over a network 1320 via the network interface card 1308.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method for performing a resolution reconfiguration of an image sensor hardware without dropping frames, wherein the method comprises:
   accessing image device circuitry having the image sensor hardware embedded therein;
   setting the image sensor hardware to operate utilizing a first sensor format;
   requesting and mapping buffers for a vision data stream from the image sensor hardware in accordance with the first sensor format;
   streaming the vision data stream from the image sensor hardware in accordance with the first sensor format;
   receiving a resolution reconfiguration request to modify operation of the image sensor hardware from the first sensor format to a second sensor format; and
   performing a parallel reconfiguration of the image sensor hardware, wherein the image device circuitry continues to process the vision data stream from the image sensor hardware in accordance with the first sensor format in parallel with the image device circuitry resetting the image sensor hardware to the second sensor format.

2. The method of claim 1:
wherein performing the parallel reconfiguration of the image sensor hardware comprises transitioning streaming of the vision data stream from the image sensor hardware in accordance with the first sensor format to streaming the vision data stream from the image sensor in accordance with the second sensor format without dropping a single frame.

3. The method of claim 1:
wherein performing the parallel reconfiguration of the image sensor hardware comprises transitioning streaming of the vision data stream via the first sensor format to streaming of the vision data stream via the second sensor format with frame-to-frame resolution reconfiguration latency being fully hidden from any application receiving the streaming of the vision data stream from the image sensor hardware.

4. The method of claim 1, wherein performing the parallel reconfiguration of the image sensor hardware comprises:
executing a main thread for application processing of the vision data stream from the image sensor hardware;
spawning a new reconfiguration thread to process reconfiguration requests received; and
joining the main thread and the new reconfiguration thread before a capture thread for the image sensor hardware wakes to resume capturing frames from the image sensor.

5. The method of claim 1, wherein performing the parallel reconfiguration of the image sensor hardware further comprises:
prohibiting reconfiguration of the image sensor hardware while a capture thread is actively capturing frames from the image sensor hardware.

6. The method of claim 5, further comprising:
defining $T_{interval}$ as an interval between consecutive frame captures;
identifying $T_{capture}$ as the time required for each frame capture;
defining a reconfiguration timing budget $T_{budget}$ as a function of a frame interval $T_{interval}$, where $T_{budget}$ is equal to frame interval $T_{interval}$ minus the required capture time $T_{capture}$; and
requiring the parallel reconfiguration of the image sensor hardware to complete within the defined reconfiguration timing budget $T_{budget}$.

7. A mobile computing device, comprising:
a memory to store instructions;
a processor to execute instructions stored within the memory
an image device having an image sensor embedded therein;
wherein the instructions cause the mobile device to perform operations including:
opening the image device having the image sensor embedded therein;
setting the image sensor to a first sensor format;
requesting and mapping buffers for a vision data stream from the image sensor in accordance with the first sensor format;
streaming the vision data stream from the image sensor in accordance with the first sensor format;
receiving a resolution reconfiguration request to change the image sensor from the first sensor format to a second sensor format;
performing a parallel reconfiguration of the image sensor, wherein the image device continues to process the vision data stream from the image sensor in accordance with the first sensor format in parallel with the image device resetting the image sensor to the second sensor format; and
wherein performing the parallel reconfiguration of the image sensor comprises transitioning streaming of the vision data stream from the image sensor hardware in accordance with the first sensor format to streaming the vision data stream from the image sensor in accordance with the second sensor format without dropping a single frame.

8. The mobile computing device of claim 7:
wherein performing the parallel reconfiguration of the image sensor comprises transitioning streaming of the vision data stream via the first sensor format to streaming of the vision data stream via the second sensor format with frame-to-frame resolution reconfiguration latency being fully hidden from any application receiving the streaming of the vision data stream from the image sensor.

9. The mobile computing device of claim 7, wherein performing the parallel reconfiguration of the image sensor comprises:
executing a main thread for application processing of the vision data stream from the image sensor;
spawning a new reconfiguration thread to process reconfiguration requests received; and
joining the main thread and the new reconfiguration thread before a capture thread for the image sensor wakes to resume capturing frames from the image sensor.

10. The mobile computing device of claim 7, wherein performing the parallel reconfiguration of the image sensor further comprises:
prohibiting reconfiguration of the image sensor while a capture thread is actively capturing frames from the image sensor.

11. The mobile computing device of claim 10, wherein the instructions cause the mobile device to perform operations further including:
defining $T_{interval}$ as an interval between consecutive frame captures;
identifying $T_{capture}$ as the time required for each frame capture;
defining a reconfiguration timing budget $T_{budget}$ as a function of a frame interval $T_{interval}$, where $T_{budget}$ is equal to frame interval $T_{interval}$ minus the required capture time $T_{capture}$; and
requiring the parallel reconfiguration of the image sensor to complete within the defined reconfiguration timing budget $T_{budget}$.

12. Non-transitory computer readable storage media having instructions stored thereupon that, when executed by a processor of a image device, the instructions cause the image device to perform operations including:
opening the image device having an image sensor embedded therein;
setting the image sensor to a first sensor format;
requesting and mapping buffers for a vision data stream from the image sensor in accordance with the first sensor format;
streaming the vision data stream from the image sensor in accordance with the first sensor format;
receiving a resolution reconfiguration request to change the image sensor from the first sensor format to a second sensor format;
performing a parallel reconfiguration of the image sensor, wherein the image device continues to process the vision data stream from the image sensor in accordance with the first sensor format in parallel with the image device resetting the image sensor to the second sensor format; and wherein performing the parallel reconfiguration of the image sensor comprises transitioning streaming of the vision data stream from the image sensor hardware in accordance with the first sensor format to streaming the vision data stream from the image sensor in accordance with the second sensor format without dropping a single frame.

13. The non-transitory computer readable storage media of claim 12:

wherein performing the parallel reconfiguration of the image sensor comprises transitioning streaming of the vision data stream via the first sensor format to streaming of the vision data stream via the second sensor format with frame-to-frame resolution reconfiguration latency being fully hidden from any application receiving the streaming of the vision data stream from the image sensor.

14. The non-transitory computer readable storage media of claim 12, wherein performing the parallel reconfiguration of the image sensor comprises:

executing a main thread for application processing of the vision data stream from the image sensor;

spawning a new reconfiguration thread to process reconfiguration requests received; and joining the main thread and the new reconfiguration thread before a capture thread for the image sensor wakes to resume capturing frames from the image sensor.

15. The non-transitory computer readable storage media of claim 12, wherein performing the parallel reconfiguration of the image sensor further comprises:

prohibiting reconfiguration of the image sensor while a capture thread is actively capturing frames from the image sensor.

16. The non-transitory computer readable storage media of claim 15, wherein the instructions cause the image device to perform operations further comprising:

defining $T_{interval}$ as an interval between consecutive frame captures;

identifying $T_{capture}$ as the time required for each frame capture;

defining a reconfiguration timing budget $T_{budget}$ as a function of a frame interval $T_{interval}$, where $T_{budget}$ is equal to frame interval $T_{interval}$ minus the required capture time $T_{capture}$; and requiring the parallel reconfiguration of the image sensor to complete within the defined reconfiguration timing budget $T_{budget}$.

\* \* \* \* \*